United States Patent
Kotake et al.

(10) Patent No.: US 8,483,573 B2
(45) Date of Patent: Jul. 9, 2013

(54) OPTICAL TRANSMISSION AND RECEPTION SYSTEM, AND OPTICAL RECEIVER

(75) Inventors: Hideaki Kotake, Fujisawa (JP); Nobuhiko Kikuchi, Tokyo (JP); Kohei Mandai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 325 days.

(21) Appl. No.: 12/987,636

(22) Filed: Jan. 10, 2011

(65) Prior Publication Data
US 2011/0182589 A1    Jul. 28, 2011

(30) Foreign Application Priority Data

Jan. 28, 2010   (JP) .................. 2010-016779

(51) Int. Cl.
*H04B 10/00* (2006.01)
*H04B 10/06* (2006.01)
(52) U.S. Cl.
USPC ........... 398/152; 398/158; 398/159; 398/205; 398/208; 398/211
(58) Field of Classification Search
None
See application file for complete search history.

(56) References Cited

U.S. PATENT DOCUMENTS

| 5,930,414 A * | 7/1999 | Fishman et al. ............ 385/11 |
| 2003/0095734 A1 | 5/2003 | Nakajima et al. |
| 2005/0036727 A1 | 2/2005 | Wijngaarden et al. |
| 2008/0232816 A1 | 9/2008 | Hoshida et al. |

FOREIGN PATENT DOCUMENTS

| JP | 62-24731 A | 2/1987 |
| JP | 2003-158488 A | 5/2003 |
| JP | 2005-65273 A | 3/2005 |
| JP | 2008-263590 A | 10/2008 |

OTHER PUBLICATIONS

D. Van Den Borne, et al., "Electrical PMD Compensation in 43-Gb/s POLMUX-NRZ-DQPSK enabled by Coherent Detection and Equalization", ECOC 2007, (Four (4) pages), paper 08.3.1.
Kittipong Piyawanno, et al., "Correlation-Based Carrier Phase Estimation for WDM DP-QPSK Transmission", IEEE Photonics Technology Letters, Dec. 15, 2008, pp. 2090-2092, vol. 20, No. 24.

* cited by examiner

*Primary Examiner* — Kenneth N Vanderpuye
*Assistant Examiner* — Darren E Wolf
(74) *Attorney, Agent, or Firm* — Crowell & Moring LLP

(57) ABSTRACT

An optical signal of an optical transmission part is brought into a high-speed polarization scrambling state by a polarization scrambling part, and transmitted to en optical fiber transmission line as the optical signal from the optical transmitter. The optical signal passing through the optical fiber transmission line is inputted to an optical receiver. The optical signal inputted to the optical receiver is converted into an electric signal by a polarization dependent photoelectric detection part. The converted electric signal is inputted to a digital signal processing part having a polarization scrambling cancel part of canceling the polarization scrambling state by a digital signal processing operation. At the digital signal processing part, the polarization scrambling state of the electric signal is canceled, and a data signal is outputted.

11 Claims, 12 Drawing Sheets

OPTICAL TRANSMISSION AND RECEPTION SYSTEM, AND OPTICAL RECEIVER

CLAIM OF PRIORITY

The present application claims priority from Japanese patent application JP 2010-016779 filed on Jan. 28, 2010, the content of which is hereby incorporated by reference into this application.

FIELD OF THE INVENTION

The present invention relates to an optical transmission and reception system and an optical receiver, particularly relates to an optical transmission and reception system which includes an optical transmitter having a polarization scrambler, and an optical receiver of canceling a high-speed polarization scrambling of an optical signal from the optical transmitter and the optical receiver.

BACKGROUND OF THE INVENTION

In recent years, traffic in the internet continues increasing rapidly, and a demand for a high transmission capacity of a core network has been increased. To meet the demand in an existing 10 Gbps wavelength division multiplexed transmission system, the upgrade from a 10 Gbps optical signal to a 40 Gbps optical signal or a 100 Gbps optical signal has been requested.

In accordance with the request for high speed modulating signal, various approaches for an optical transmission technology have been investigated. Among them, the optical multilevel transmission technology as a new modulation system substituting for intensity modulation which is utilized in an existing wavelength division multiplexed transmission system gets a lot of attention. The multilevel optical transmission technology is enable to realize a large capacity of information transmission by utilizing a phase or an amplitude of optical signal and researches have been investigated on various modulation systems of a phase shift keying (PSK, Phase Shift Keying), a quadrature amplitude modulation (QAM, Quadrature Amplitude Modulation). Also, in optical receivers, there has been carried out an investigation which is combined not only with direct detection used in an existing wavelength division multiplexed transmission system, but also with various modulation systems of coherent detection, incoherent detection. Recently, as a modulation method of a 40 Gbps optical signal, RZ-DQPSK (Return-to-Zero Differential Quadrature Phase Shift Keying) using incoherent detection becomes mainstream, and optical transceivers and pieces of optical transmission equipment have been developed. Also in a modulation method of a 100 Gbps optical signal, PM-QPSK (Polarization-Multiplexed Quadrature Phase Shift Keying) using coherent detection gets a lot of attention, and research and development has been carried out on an optical transceivers.

Moreover, polarization multiplexing gets a lot, of attention. The polarization multiplexing is a method of transmitting two independent signals from each other by utilizing two polarization states having the same wavelength and orthogonal to each other. Due to this method, a modulation rate can be halved, and combined with the optical multilevel transmission technology described above, not only a high-speed modulating signal can be realized by low symbol rate, but a high transmission rate can be realized. Such polarization multiplexing is disclosed in, for example, JP-A-62-024731.

SUMMARY OF THE INVENTION

By passing through optical fiber transmission line, optical signal waveform is degraded by chromatic dispersion, polarization mode dispersion and the like. These waveform degradations constitute a factor of increasing a bit error in transmission, and constitute a hindrance in communications. However, these degradations can be compensated using optical compensators, compensating circuits which include a digital signal processing technology or the like on a receiving side.

On the other hand, degradations such as an optical nonlinearity effect and a polarization dependent loss (PDL, Polarization Dependent Loss) exist. The optical nonlinearity effect is a phenomenon in which a refractive index is changed in accordance with an optical intensity of the transmitted optical signal per se or an optical intensity of an optical signal contiguous thereto, thereby, an optical phase of the transmitted optical signal is changed, and the waveform is deteriorated. Particularly, in wavelength multiplexed transmission, an optical signal undergoes an influence of crosstalk between contiguous optical channels (XPM, Cross Phase Modulation), and therefore, a receiver sensitivity is degraded. Further, PDL is an attenuation of a polarization component of an optical signal which is generated to a certain specific polarization axis, which constitutes a hindrance particularly against transmission of a polarization-multiplexed optical signal. When PDL is generated at a polarization-multiplexed optical signal, one polarization component of a polarization-multiplexed optical signal is attenuated, polarization-multiplexed optical signals are received without maintaining an orthogonality of two polarization components between the polarization-multiplexed optical signals, and therefore, a receiver sensitivity is degraded. The waveform degradations are difficult to be compensated for even by an optical device or a digital signal processing circuit, and a problem is posed thereby in an optical transmission system. A description that the compensation is difficult with regard to PDL or the optical nonlinearity effect in the digital signal processing technology described above is shown in, for example, O. Van den Borne, et al, "Electrical PMD compensation in 43-Gbps POLMUX-NRZ-DQPSK enabled by Coherent Detection and Equalization", ECOC 2007, paper 08.3.1., K. Piyawanno, et al, "Correlation-Based Carrier Phase Estimation for WON DP-QPSK Transmission", IEEE Photonics Technology Letters Vol. 20, No. 24, 2008, pp. 2090-2092.

According to an existing optical communication system, there is an application example by a polarization independent optical receiver which includes a polarization scrambler (PS, Polarization Scrambler) which is known as an optical device of reducing PDL or the optical nonlinearity effect, and a forward error correction (FEC, Forward Error Correction) circuit which is one of methods of correcting error bits owing to transmission. The polarization scrambler includes a function of varying a polarization of an optical signal over time such that scrambling is carried out at a specific frequency. Further, the FEC circuit includes a function of adding a redundant bit to an information bit to transmit, utilizing the redundant bit when the bit error is brought about in transmission, and correcting the erroneous bits on a receiver side. Hence, by carrying out polarization scrambling (a high-speed variation over time of a polarization) at a frequency higher than a fixed frequency which is an inverse number of one period of an error correction block code length of the FEC circuit, a probability of being coincident with a polarization axis at which PDL is generated and a polarization face of a contiguous optical channel is reduced. Thereby, an influence of PDL or the optical nonlinearity effect is averaged, and a reduction thereof can be carried out. A principle of operating the polarization scrambler and the FEC circuit, and an application example by a polarization independent optical receiver having these are described in, for example, JP-A-2003-158488, and JP-A-2005-65273.

On the other hand, there is a polarization dependent optical receiver of a coherent optical receiver, or a polarization multiplexed optical receiver. It is necessary for a coherent optical receiver to make polarization states of an optical signal and a non-modulated light of a local oscillator coincide with each other, it is necessary for the polarization multiplexed optical receiver to carry out a control of a polarization state of a polarization-multiplexed optical signal to match a polarization axis of a polarization separator, and therefore, the polarization dependent optical receiver is featured in being dependent on a polarization state of an optical signal.

Therefore, when a polarization scrambler is introduced into an optical transmitter, and an optical signal which is brought into a high-speed polarization scrambling is received by a polarization dependent optical receiver, the receiver cannot track a polarization scrambling frequency, and the reception becomes difficult. Particularly, in a case of a polarization-multiplexed optical signal, the optical signal is detected in a state of varying a polarization, and therefore, an X polarization component and a Y polarization component of the optical signal cannot adequately be separated but are mixed, and the reception cannot be carried out.

It is an object of the present invention to receive an optical signal in a high-speed polarization scrambling caused by a polarization scrambler by a polarization dependent optical receiver regardless of a polarization scrambling frequency.

According to the present invention, the above-described problem is resolved by the following units.

The above-described problem can be resolved by an optical transceiver which includes an optical transmitter and an optical receiver connected to the optical transmitter by an optical fiber transmission line, and is featured in that the optical transmitter includes an optical transmission unit of generating an optical signal of a single polarized wave or an optical signal of a polarization-multiplexed wave, and a polarization scramble unit of bringing the optical signal generated train the optical transmission unit into a high-speed polarization scrambling, and the optical receiver includes polarization dependent optical detection unit, and polarization scrambling cancel unit of canceling the polarization scrambling of the optical signal with regard to the optical signal transmitted from the optical transmitter and brought into the polarization scrambling.

A first optical transmission and reception system according to the present invention is an optical transmission and reception system which includes first optical transmission equipment and second optical transmission equipment connected to the first optical transmission equipment by an optical fiber, and an optical transmission and reception system which is featured in that the first optical transmission equipment includes an optical transmission unit of generating an optical signal of a single polarized wave or an optical signal of a polarization-multiplexed wave, a polarization scramble unit of subjecting the optical signal generated from the optical transmission unit to polarization scramble based on a polarization scramble driving signal, a polarization scramble driving unit of generating a signal which is the polarization scramble driving signal and is set to a predetermined frequency, and a polarization scramble unit related information transferring unit of acquiring and transferring information related to the polarization scramble unit, and the second optical transmission equipment includes a polarization scrambling cancel unit of canceling the polarization scramble based on a polarization scramble cancel driving signal with regard to the optical signal brought into the polarization scrambling by the polarization scramble unit, a polarization scramble canceling driving unit of generating a signal which is the polarization scramble driving signal and is set to a predetermined frequency, a polarization scrambling cancel unit controlling unit of controlling the polarization scramble canceling driving unit based on information related to the polarization scramble unit, and a polarization dependent optical receiving unit of receiving the optical signal canceling the polarization scrambling by the polarization scrambling cancel unit.

A second optical transmission and reception system according to the present invention is an optical transmission and reception system which includes first optical transmission equipment and second optical transmission equipment connected to the first optical transmission equipment by an optical fiber, and is an optical transmission and reception system which is featured in that the first optical transmission equipment includes an optical transmission unit of generating an optical signal of a single polarized wave or an optical signal of a polarization-multiplexed wave, a polarization scramble unit of subjecting the optical signal generated from the optical transmission unit to polarization scramble based on a polarization scramble driving signal, a polarization scramble driving unit of generating a signal which is the polarization scramble driving signal and is set to a predetermined frequency, and a polarization scramble unit related information transferring unit of acquiring and transferring information related to the polarization scramble unit, and the second optical transmission equipment includes a polarization dependent optical receiving unit which includes a polarization dependent optical detecting unit of detecting the optical signal brought into the polarization scrambling by the polarization scramble unit and converting the optical signal into an electric signal, and a signal processing unit of subjecting the electric signal converted by the polarization dependent optical detecting unit to a signal processing for canceling the polarization scrambling, and a polarization scrambling cancel unit controlling unit of controlling the signal processing unit based on information related to the polarization scramble unit.

A third optical transmission and reception system according to the present invention is an optical wavelength multiplexing transmission and reception system which includes first optical transmission equipment and second optical transmission equipment connected to the first optical transmission equipment by an optical fiber, and an optical transmission and reception system which is featured in that the first optical transmission equipment includes 1-th through n-th optical transmission units of generating optical signals of single polarized waves or optical signals of polarization-multiplexed waves, 1-th through n-th polarization scramble units of subjecting the 1-th through n-th optical signals generated from the 1-th through n-th optical transmission units to polarization scramble based on 1-th through n-th polarization scramble driving signals, 1-th through n-th polarization scramble driving units of generating signals which are the 1-th through n-th polarization scramble driving signals and are set to 1-th through n-th different predetermined frequencies, a polarization scramble unit related information transferring unit of acquiring and transferring information related to the 1-th through n-th polarization scramble units, and an optical multiplexing unit of multiplexing the 1-th through n-th optical signals as a wavelength-multiplexed optical signal, and the second optical transmission equipment includes an optical demultiplexing unit of demultiplexing the wavelength-multiplexed optical signal transmitted from the first optical transmission equipment as the 1-th through n-th optical signals, 1-th through n-th polarization dependent optical receiving units which include 1-th through n-th polarization dependent optical detecting units of detecting the 1-th through n-th optical signals brought into the polarization scrambling by the 1-th through n-th polarization scramble units and converting the 1-th through n-th optical signals into 1-th through n-th electric signals, and 1-th through n-th signal processing units of subjecting the 1-th through n-th electric signals converted by the 1-th through n-th polarization dependent optical detecting units to a signal processing for canceling the polarization scrambling, and a polarization scrambling cancel unit controlling unit of controlling the 1-th through n-th signal processing units based on the information related to the 1-th through nth polarization scramble units.

A fourth optical transmission and reception system according to the present invention is an optical wavelength division multiplexed transmission system which includes first optical transmission equipment and second optical transmission equipment connected to the first optical transmission equipment by an optical fiber, and is an optical transmission and reception system which is featured in that the first optical transmission equipment includes 1-th through n-th optical transmission units of generating optical signals of single polarized waves or optical signals of polarization-multiplexed waves, an optical multiplexing unit of multiplexing the 1-th through n-th optical signals as a wavelength-multiplexed optical signal, a polarization scramble unit of subjecting the polarization-multiplexed optical signal to polarization scramble based on a polarization scramble driving signal, polarization scramble driving unit of generating a signal which is the polarization driving signal and is set to a predetermined frequency, and polarization scramble unit related information transferring unit of acquiring and transferring information related to polarization scramble unit, and the second optical transmission equipment includes polarization scrambling cancel unit of subjecting the polarization-multiplexed optical signal brought into the polarization scrambling by the polarization scramble unit to polarization scramble canceling based on a polarization scramble canceling driving signal, optical demultiplexing unit of demultiplexing the polarization-multiplexed optical signal the polarization scrambling of which is cancelled by the polarization scrambling cancel unit as the 1-th through n-th optical signals, 1-th through nth polarization dependent optical detecting units of detecting the 1-th through n-th optical signals and converting the 1-th through n-th optical signals into 1-th through n-th electric signals, polarization scramble canceling driving unit of generating a signal which is the polarization scramble driving signal and is set to a predetermined frequency, and polarization scrambling cancel unit controlling unit of controlling the polarization scramble canceling driving unit based on the information related to the polarization scramble unit.

A fifth optical transmission and reception system according to the present invention is an optical wavelength multiplexing transmission and reception system which includes first optical transmission equipment and second optical transmission equipment connected to the first optical transmission equipment by an optical fiber, and an optical transmission and reception system which is featured in that the first optical transmission equipment includes 1-th through n-th optical transmission units of generating optical signals of single polarized waves or optical signals of polarization-multiplexed waves, an optical multiplexing unit of multiplexing the 1-th through n-th optical signals as a wavelength-multiplexed optical signal, a polarization scramble unit of subjecting the polarization-multiplexed optical signal to polarization scramble based on a polarization scramble driving signal, a polarization scramble driving unit of generating a signal which is the polarization scramble driving signal and is set to a predetermined frequency, and a polarization scramble unit related information transferring unit of acquiring and transferring information related to the polarization scramble unit, and the second optical transmission equipment includes an optical demultiplexing unit of demultiplexing the polarization-multiplexed optical signal transmitted from the first optical transmission equipment as the 1-th through n-th optical signals, 1-th through n-th polarization dependent optical receiving units which include 1-th through n-th polarization dependent optical detecting units of detecting the 1-th through n-th optical signals brought into the polarization scrambling by the 1-th through n-th polarization scramble units and converting the 1-th through n-th optical signals into 1-th through n-th electric signals, and 1-th through n-th signal processing units of subjecting the 1-th through n-th electric signals converted by the 1-th through n-th polarization dependent optical detecting units to a signal processing for canceling the polarization scrambling, and a polarization scrambling cancel unit controlling unit of controlling the 1-th through n-th signal processing units based on the information related to the polarization scramble unit.

According to a first aspect of the present invention, an optical transmission and reception system includes an optical transmitter of transmitting an optical signal, and an optical receiver of receiving the optical signal through an optical fiber;

in which the transmitter has:

an optical transmitting part of generating the optical signal, and a polarization scrambler of bringing the optical signal into polarization scrambling, and in which the optical receiver has:

a polarization dependent photoelectric detecting part of converting the optical signal received through the optical fiber into an electric signal; and a digital signal processing part having a polarization scramble canceling part of canceling the polarization scrambling by a digital signal processing operation by calculating an inverse matrix of a matrix of Jones Matrix representing the polarization scrambling at the polarization scrambler based on a polarization scrambling frequency at the polarization scrambler, and a pattern of a variation over time of the polarization scramble of the polarization scrambler and multiplying the electric signal converted by the polarization dependent photoelectric detecting part by the inverse matrix.

According to a second aspect of the present invention, an optical transmission and reception system which includes an optical transmitter that transmits an optical signal, and an optical receiver that receives the optical signal through an optical fiber;

in which the optical transmitter has:

an optical transmitting part of generating the optical signal, and a polarization scrambler of bringing the optical signal into polarization scrambling, and in which the optical receiver has:

a polarization scramble canceling part of canceling the polarization scrambling of the received optical signal by subjecting the optical signal received from the optical transmitter to polarization scramble by a polarization scrambling frequency the same as a polarization scrambling frequency of the polarization scrambler, and a pattern of a variation over time in a direction inverse to a direction of the polarization scramble of the polarization scrambler, and a polarization dependent optical receiving part of receiving the optical signal the polarization scrambling of which is canceled by the polarization scramble canceling part.

According to a third aspect of the present invention, an optical receiver in an optical transmission and reception system which includes an optical transmitter that brings an optical signal into polarization scrambling by a polarization scrambler and transmits the optical signal, and the optical receiver that receives the optical signal through an optical fiber, the optical receiver has:

a polarization dependent photoelectric detecting part that converts the optical signal received through the optical fiber into an electric signal; and digital signal processing part having a polarization scramble canceling part of and canceling the polarization scrambling by a digital signal processing operation by calculating an inverse matrix of a matrix of Jones Matrix representing the polarization scrambling of the polarization scrambler based on a polarization scrambling frequency of the polarization scrambler, and a pattern of a variation overtime of polarization scramble of the polarization scrambler, and multiplying the electric signal converted by the polarization dependent photoelectric detecting part by the inverse matrix.

According to a fourth aspect of the present invention, there is provided an optical receiver which is an optical receiver in an optical transmitting/receiving which includes an optical transmitter of bringing an optical signal into polarization scrambling by a polarization scrambler and transmitting the optical signal, and the optical receiver of receiving the optical signal through an optical fiber, the optical receiver includes a polarizing scramble canceling part of canceling the polarization scrambling of the optical signal received by subjecting the optical received from the optical transmitter to polarization scramble by a polarization scrambling frequency the same as a polarization scrambling frequency of the polarization scrambler, and a pattern of a variation over time in a direction inverse to a direction of the polarization scramble of the polarization scrambler, and a polarization dependent optical receiving part of receiving the optical signal the polarization scrambling of which is canceled by the polarization scramble canceling part.

According to the present invention, with regard to an optical signal brought into a high-speed polarization scrambling, the polarization scrambling can be canceled regardless of a polarization scrambling frequency, and the optical signal is made to be able to be received by a polarization dependent optical receiver.

DETAILED DESCRIPTION OF THE PREFERRED EMBODIMENTS

A detailed explanation will be given of an embodiment of an optical transmission and reception system according to the present invention in reference to attached drawings as follows.

1. First Embodiment

First, an explanation will be given of an optical transmission and reception system according to a first embodiment of the present invention.

Figure 1:
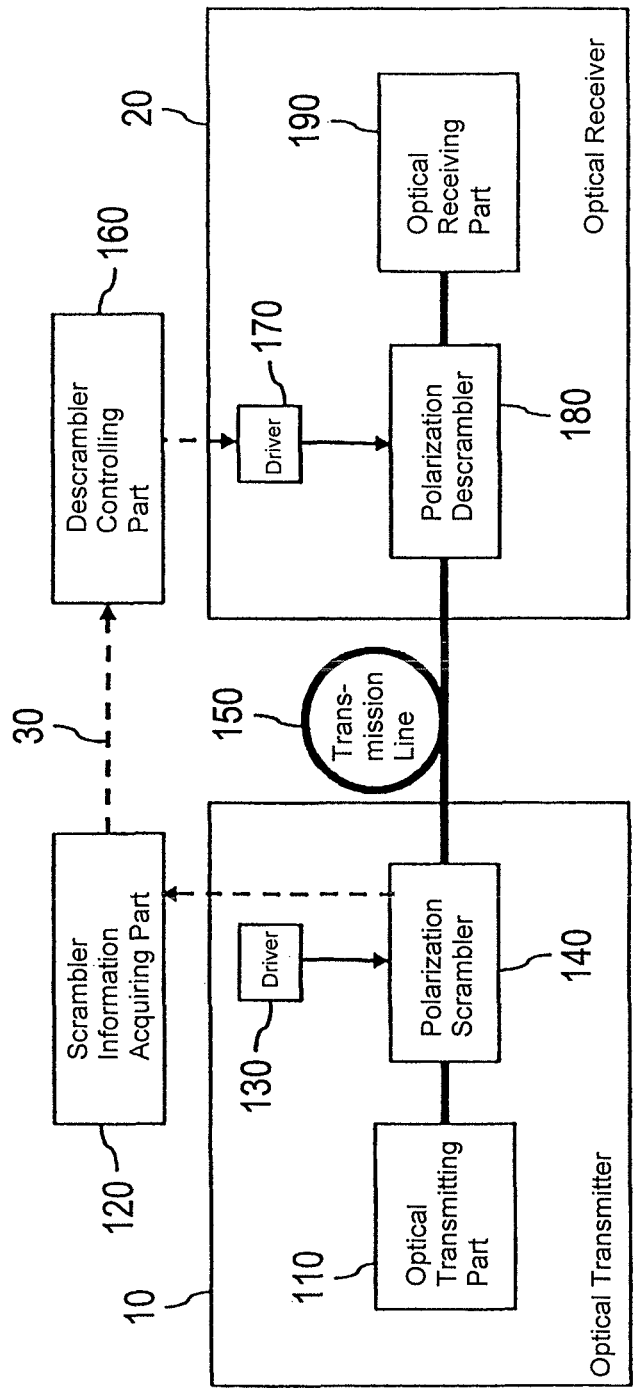
FIG. 1 is a diagram showing an optical transmission and reception system according to a first embodiment of the present invention.

FIG. 1 is a diagram of a constitution of an optical transmission and reception system according to the first embodiment. As shown by the drawing, the optical transmission and reception system according to the first embodiment includes an optical transmitter 10 of transmitting an optical signal and an optical receiver 20 of receiving are optical signal, a polarization scrambler information acquiring part 120, a polarization descrambler controlling part 160, an optical fiber transmission line 150, and a control network 30. The optical transmitter 10 and the optical receiver 20 are connected by the optical fiber transmission line 150 and the control network 30.

The optical transmitter 10 includes an optical transmitting part 110, a polarization scrambler driver 130, and a polarization scrambler 140.

The optical transmitting part 110 differs in a constitution thereof by whether an optical modulating signal to be transmitted is constituted by a single polarized we or a polarization-multiplexed wave. An explanation will be given of constitutions in a case where a transmitted optical signal is constituted by a single polarized wave in reference to FIG. 2, and in a case where a transmitted optical signal is constituted by a polarization-multiplexed wave in reference to FIG. 3.

Figure 2:
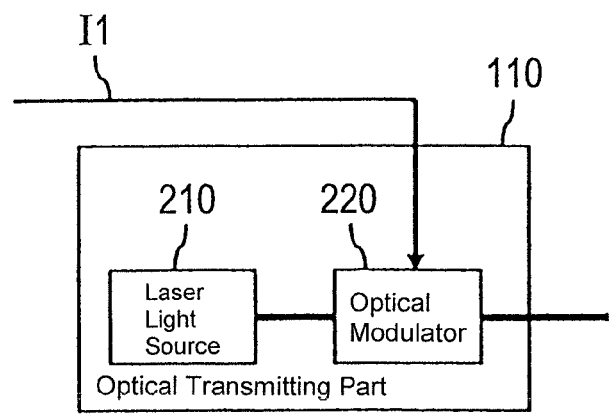
FIG. 2 is a diagram showing a constitution of an optical transmitter in a case where an optical modulating signal is constituted by a single polarized wave.

FIG. 2 is a diagram of a constitution of the optical transmitting part 110 in the case of the single polarized wave.

As shown by the drawing, the optical transmitting part 110 includes a laser light source 210, and an optical modulator 220. A non-modulated (CW, Continuous Wave) light generated from the laser light source 210 is inputted to the optical modulator 220. The CW light is modulated in accordance with an input data signal I1 inputted to the optical modulator 220 on one hand, and an optical modulating signal is outputted from the optical modulator 220. As a modulation system, any of a phase modulation system of changing a phase of light, a frequency modulation system of changing a frequency of light, and intensity modulation of changing an intensity of light may be adopted. Further, the input data signal may be constituted by signals constituted by separating a single data signal in two, or separate data which are not related each other at all. The optical modulator 220 may be, for example, an LN phase modulator, a Mach Zender (MZ, Mach Zender) type modulator, or a quadrature (IQ) modulator constituted by two pieces of the MZ type modulators in parallel. When transmission of m-PSK and m-QAM (m is equal to or larger than 4) is assumed, the IQ modulator is pertinent.

Figure 3:
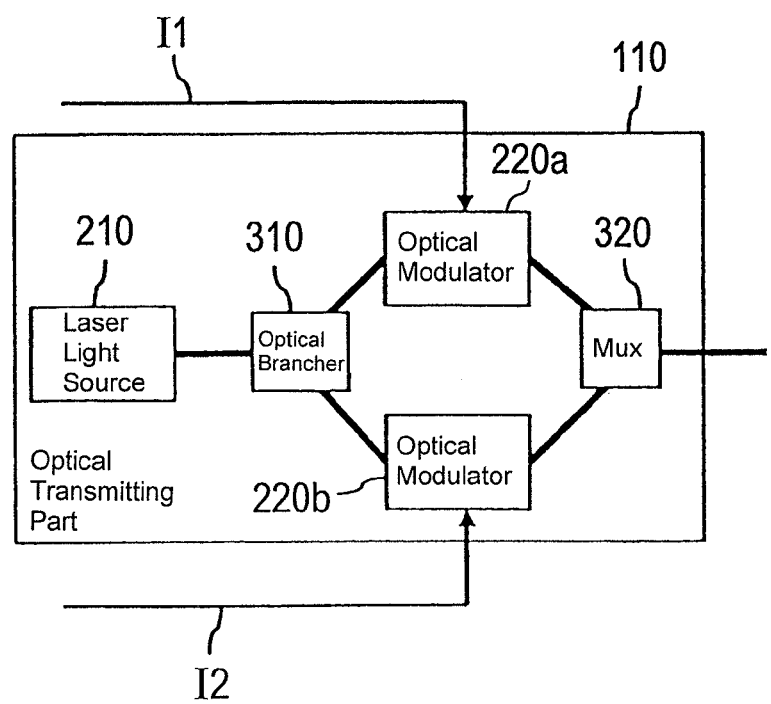
FIG. 3 is a diagram showing a constitution of an optical transmitter in a case where an optical modulating signal is constituted by a polarization-multiplexed wave.

FIG. 3 is a diagram of a constitution of the optical transmitting part 110 in the case of the polarization-multiplexed wave.

As shown by the drawing, the optical, transmitting part 110 includes the laser light source 210, an optical brancher 310, optical modulators 220a, and 220b, and a polarized wave multiplexer 320. The optical modulator 220a, and the optical modulator 220b, and the polarized wave multiplexer 320 are connected by a polarization maintaining fiber (PMF, Polarization Maintaining Fiber).

The CW light generated from the laser light source 210 is inputted to the optical branches 310, and branched in two directions, and branched beams of the CW light are respectively inputted to the optical modulator 220a, and the optical modulator 220b. At the optical modulator 220a, the CW light is modulated in accordance with the input data signal I1 which is inputted on one hand, the CW light is modulated in accordance with an input data signal I2 which is inputted on the other hand, and optically modulated signals are respectively outputted from the optical modulator 220a and the optical modulator 220b. As a modulation system, any of a phase modulation system of changing a phase of light, a frequency modulation system of changing a frequency of light, and intensity modulation of changing an intensity of light may be adopted. Further, the input data signals I1, and I2 may be signals constituted by separating a single data signal in two, or may be signals of separate data which are not related to each other at all. Bit rates of the input data signals I1, and I2 may be the same, or may differ from each other.

The polarized wave multiplexer 320 generates a polarization-multiplexed optical signal by synthesizing the optically modulated signal modulated by the optical modulator 220a, and the optically modulated signal modulated by the optical modulator 220b in polarized wave states orthogonal to each other (for example, TE polarized wave and TM polarized wave). The polarization-multiplexed optical signal outputted from the polarized multiplexer 320 is outputted from the optical transmitting part 110.

The optical signal outputted from the optical transmitting part 110 of FIG. 1 is inputted to the polarization scrambler 140. As the polarization scrambler 140, an optical device of rotating polarization of the optical signal at high speed such as a polarization scrambler is pertinent. The polarization scrambler 140 carries out polarization scramble of the inputted optical signal in accordance with a control signal generated from the polarization scrambler driver 130, an optical signal subjected to polarization scramble is outputted from the polarization scrambler 140, and passes through the optical fiber transmission line 150 as a transmitted optical signal of the optical transmitter 10.

The control signal generated from the polarization scrambler driver 130 is a control signal having a predetermined frequency, and the frequency corresponds to a polarization scrambling frequency of the polarization scrambler 140. At this occasion, although the polarization frequency may be of any value, it is pertinent to set the polarization scrambling frequency to a frequency higher than a frequency inherent to an FEC circuit achieving an effect of reducing PDL and the optical nonlinearity effect by the polarization scramble. The polarization scrambler information acquiring part 120 acquires information of setting the polarization scrambler 140 of carrying out the polarization scramble (for example, a polarization scrambling frequency, a direction of a variation over time of polarization scramble and a pattern of the variation or the like), and transfers the set information through the control network 30.

The optical receiver 20 of FIG. 1 includes a polarization descrambler driver 170, a polarization descrambler (polarization scramble canceling part) 180, and a polarization dependent optical receiving part 190.

An optical signal which is transmitted from the optical transmitter 10 and passes through the optical fiber is transmission line 150 is inputted to the optical receiver 20 of FIG. 1, and is inputted to the polarization descrambler 180. As the polarization descrambler, an optical device such as a polarization scrambler of varying a polarization of an optical signal in the direction inverse to the direction of the polarization scrambler 140 at a high speed is pertinent. The polarization descrambler 180 cancels polarization scrambling of an optical signal subjected to polarization scramble at the polarization scrambler 140 by subjecting an optical signal which has been subjected to polarization scramble at the polarization scrambler 140 in a direction inverse to a direction of rotation of the polarization scramble at the polarization scrambler 140, at a polarization scrambling frequency the same as that of the polarization scrambler 140. The optical signal the polarization scrambling of which is canceled by the polarization descrambler 180 is received by the polarization dependent optical receiving part 190.

A control signal generated from the polarization descrambler driver 170 is a control signal having a predetermined frequency, and the frequency corresponds to the polarization scrambling frequency of the polarization scrambler 140, and is set such that the polarization scramble is carried out in a direction inverse to a direction of a variation over time of the polarization scrambler 140. Information of setting the polarization scrambler 140 of carrying out the polarization scramble (for example, a polarization scrambling frequency, a direction of a variation over time of the polarization scramble, and a pattern of the variation and the like) is transferred from the polarization scrambler information acquiring part 120 through the control network, and the information is received by the polarization descrambler control part 160. The polarization descrambler controlling part 160 operates the polarization descrambler driver 170 based on the set information.

With regard to the set information of the polarization scrambler 140, a data base for storing the set information may be prepared on the control network 30, and the polarization descrambler controlling part 160 may be made to be able to make access to the database. Or, the set information of the polarization scrambler 40 may be inputted from the polarization scrambler information acquiring part 120 to the optical fiber transmission line 150 by a monitoring control optical signal (OSC, Optical Supervisor Call), and the set information may be acquired by receiving the monitoring control optical signal from the optical fiber transmission line 150 by the polarization descrambler controlling part 160 which includes an optical detecting part. Further, the polarization descrambler 180 may be operated by setting previously information of the polarization scrambler 140 at the polarization descrambler driver 170. Or, a polarization state monitoring part that monitors the polarization state of the optical signal may be installed, and the set information of the polarization scrambler 140 may be read from a variation of the polarization state. Further, the set information of the polarization scrambler 140 may not be acquired, but while measuring a bit error rate (BER) or a deterioration in an eye opening of an eye pattern or the like by the polarization dependent optical receiving part 190, the bit error rate or the deterioration may be delivered to the polarization descrambler 170, and the polarization scrambling frequency of the polarization descrambler 180 may be adjusted such that values of these are reduced. At this occasion, a direction of rotation of the polarization descrambler 180 needs to be set in a direction inverse to that of the polarization scrambler 140.

Further, there is a case in which a variation of the polarization scrambling frequency of the polarization scrambler 140 or the polarization descrambler 180 is brought about, and an optical signal is inputted to the polarization dependent optical receiving part 190 without canceling polarization scrambling of the optical signal outputted from the polarization descrambler 180. A measure for resolving the case can be realized by various methods such that while measuring the bit error rate (BER, Bit Error Rate) or the deterioration in the eye opening of the eye pattern or the like, the bit error rate or the deterioration is delivered to the polarization descrambler controlling part 160, and the polarization descrambler controlling part 160 adjusts the polarization scrambling frequency of the polarization descrambler 180, thereby, values of these are reduced.

The polarization dependent optical receiving part 190 of FIG. 1 differs in a constitution thereof by whether the received optical modulating signal is constituted by a single polarized wave, or a polarization-multiplexed wave. An explanation will be given of a constitution in a case where the optical modulating signal is constituted by a single polarized wave, and coherent detection by an analog phase locked loop (PLL, Phase Locked Loop) of adjusting a wavelength of a local oscillator by feeding back an electric signal in reference to FIG. 4, a constitution of a case where the optical modulating signal is constituted by a single polarized wave and a digital coherent detection is adopted in reference to FIG. 5, a constitution in a case where the optical modulating signal is constituted by a polarization-multiplexed wave and a receiving system other than the digital coherent detection is adopted in reference to FIG. 6, or a constitution of a case where the optical modulating signal is constituted by a polarization-multiplexed wave and the digital coherent detection is adopted in reference to FIG. 7.

Figure 4:
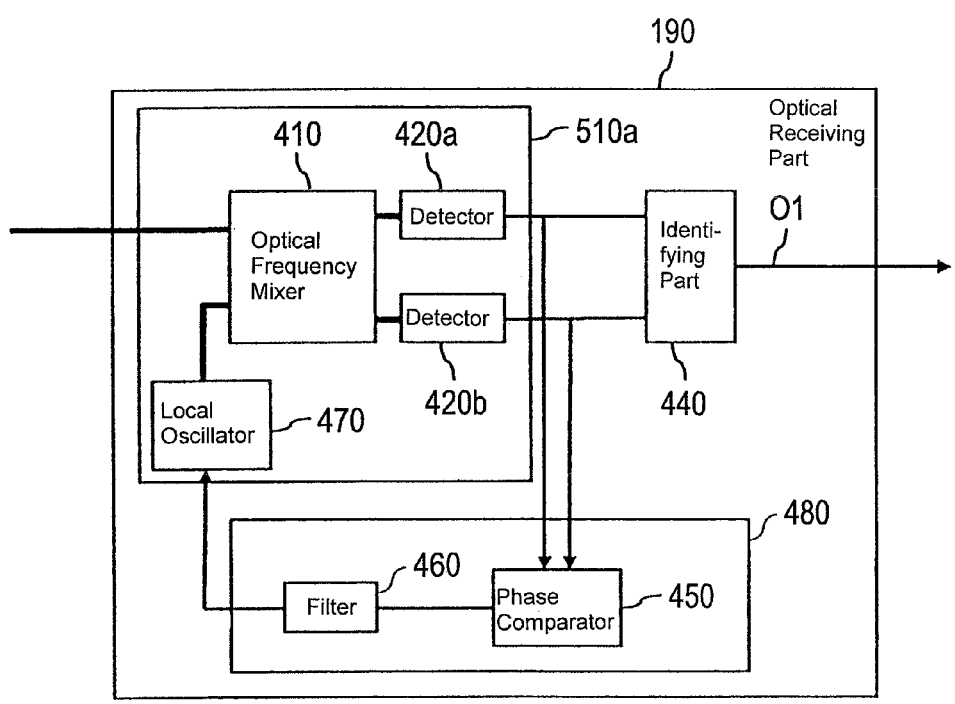
FIG. 4 is a diagram showing a constitution of a polarization dependent optical receiving part in a case where an optical modulating signal is constituted by a single polarized wave and coherent detection by analog PLL is adopted.

FIG. 4 is a diagram of the constitution of the polarization dependent optical receiving part 190 in the case where the optical modulating signal is constituted by the single polarized wave and the coherent detection by the analog phase locked loop is adopted.

As shown by the drawing, the polarization dependent optical receiving part 190 includes a polarization dependent photoelectric detecting part 510*a*, an analog phase locked loop 480, and an identifying part 440. The polarization dependent photoelectric detecting part 510*a* includes an optical frequency mixer 410, a photoelectric detector 420*a*, a photoelectric detector 420*b*, and a local oscillator 470, and the analog phase locked loop 480 includes a phase comparator 450, and a loop filter 460.

An optical signal inputted to the polarization dependent optical receiving part 190 of FIG. 4 is inputted to the optical frequency mixer 410. The optical signal inputted to the optical frequency mixer 410 is mixed with a non-modulated (CW, Continuous Wave) light of the local oscillator 470 inputted to the optical frequency mixer 410 on the other hand in optical frequencies, and outputted as an optical signal of an I phase component and an optical signal of a Q phase component from the optical frequency mixer 410, and the optical signals are respectively inputted to the photoelectric detector 420*a* and the photoelectric detector 420*b*. The optical signals inputted to the photoelectric detector 420*a* and the photoelectric detector 420*b* are respectively converted into electric signals of an I phase component and electric signals of a Q phase component, and branched in twos. One signal of the signals branched in two is converted into a data signal O1 by the identifying part 440.

The other one signals of the signals branched into twos are respectively inputted to the analog phase locked loop 480 and inputted to the phase comparator 450, and phase differences of the electric signals of the I phase component and the Q phase component are detected. The signals after detection are inputted to the loop filter 460 having a role of a low pass filter and suppressing a rapid variation in the phase difference. A signal outputted from the loop filter 460 is inputted to the local oscillator 470, and a wavelength of the local oscillator 470 is controlled such that the phase difference is nullified (such that the wavelength becomes the same as a wavelength of a laser light source at inside of the optical transmitter). Receiving of data can be realized by the series of operations.

Figure 5:
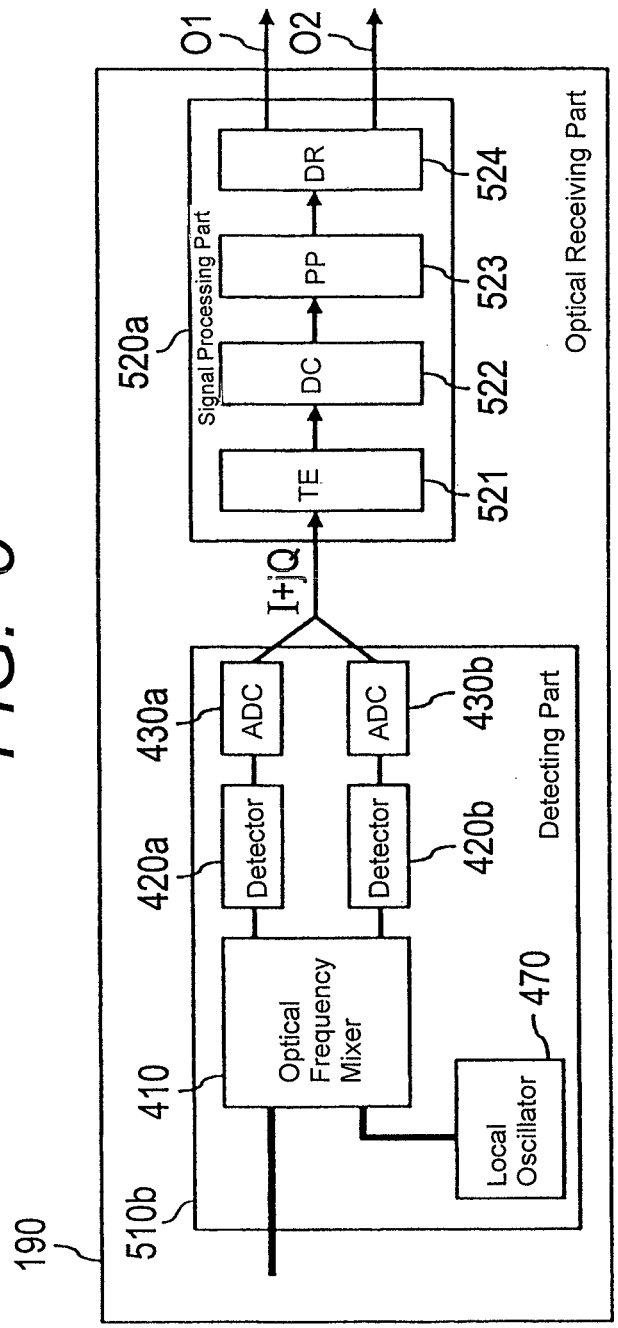
FIG. 5 is a diagram showing a constitution of a polarization dependent optical receiving part in a case where an optical modulating signal is constituted by a single polarized wave and a digital coherent detection is adopted according to the first embodiment of the present invention.

FIG. 5 is a diagram of the constitution of the polarization dependent optical receiving part 190 in the case where the optical modulating signal is constituted by the single polarized wave and the digital coherent detection is adopted.

As shown by the drawing, the polarization dependent optical receiving part 190 includes a polarization dependent photoelectric detecting part 510*b*, and a digital signal processing part 510*a*. The polarization dependent photoelectric detecting part 510*b* includes the optical frequency mixer 410, the photoelectric detector 420*a*, the photoelectric detector 420*b*, an analog-to-digital converter 430*a*, an analog-to-digital converter 430*b*, and the local oscillator 470. The digital signal processing part 520*a* includes a timing extracting part 521, a dispersion compensating part 522, a phase predicting part 523, and a data recovering part 524.

An optical signal inputted to the polarization dependent optical receiving part 190 of FIG. 5 is inputted to the polarization dependent photoelectric detecting part 510*b*. The optical signal inputted to the polarization dependent photoelectric detecting cart 510*b* is inputted to the optical frequency mixer 410, and is mixed with a non-modulating (CW, Continuous Wave) light of the local oscillator 470 inputted to the optical frequency mixer 410 on the other hand in optical frequencies. The optical signals are outputted from the optical frequency mixer 410 as an optical signal of an I phase component and an optical signal of a Q phase component, and the optical signals are respectively inputted to the photoelectric detector 410*a* and the photoelectric detector 410*b*. The optical signals inputted to the photoelectric detector 420a and the photoelectric detector 420b are respectively converted into electric signals of the I phase component and electric signals of the Q phase component, and respectively inputted to the analog-to-digital converter 430a and the analog-to-digital converter 430b. The electric signals inputted to the analog-to-digital converter 430a and the analog-to-digital converter 430b are respectively outputted as digital electric signals and converted into a complex number symbol sequence described as I+jQ. The complex number symbol sequence is inputted to the digital signal processing part 520a.

The complex number symbol sequence inputted to the digital signal processing part 520a is inputted to the timing extracting part 521, and a processing of extracting a timing by a processing of a band pass filter in a frequency region or the like is carried out. An output from the timing extracting part 521 is inputted to the dispersion compensating part 522, and the output is subjected to a processing of a wavelength dispersion compensation using an FIR (Finite Impulse Response) filter or the like. An output from the dispersion compensating part 522 is inputted to the phase predicting part 523, and the output is subjected to compensation for a phase offset and a frequency offset using a phase predicting algorithm of VVA (Viterbi & Viterbi Algorithm) or the like. An output from the phase predicting part 523 is inputted to the data recovering part 524, and the recovery to a digital data is carried out, Output data signals O1, O2 are outputted from the data recovering part 524.

Figure 6:
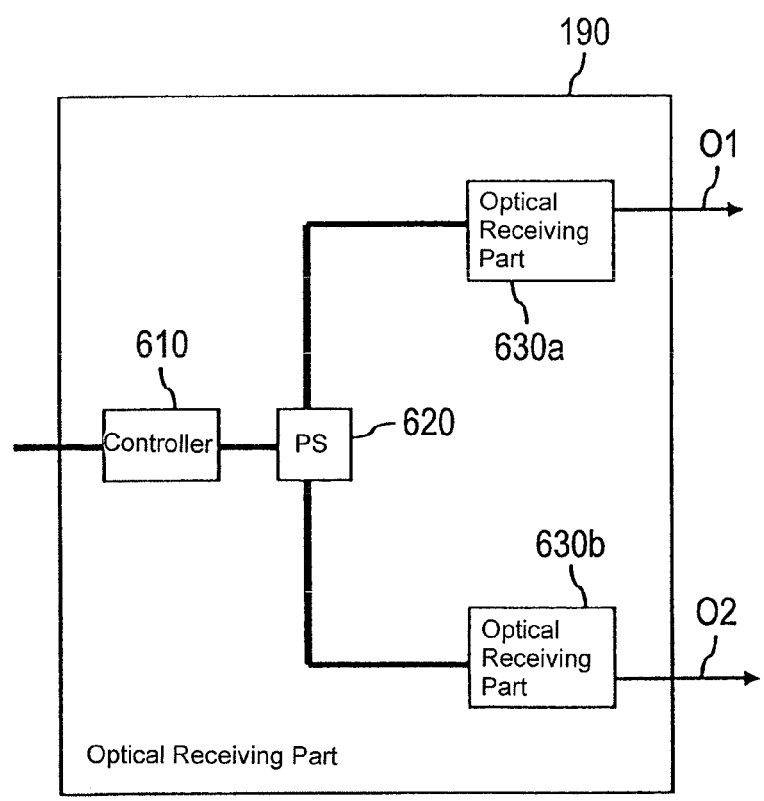
FIG. 6 is a diagram showing a constitution of a polarization dependent optical receiving part in a case where an optical modulating signal is constituted by a polarization-multiplexed wave and a receiving system other than a digital coherent detection is adopted.

FIG. 6 is a diagram of the constitution of the polarization dependent optical receiving part 190 in the case where the optical modulating signal is constituted by the polarization-multiplexed wave and the receiving system other than the digital coherent detection is adopted. As shown by the drawing, the polarization dependent optical receiving part 190 includes a polarization controller 610, a polarization separator 620, an optical receiving part 630a, and an optical receiving part 630b.

A polarization-multiplexed wave optical signal inputted to the polarization dependent optical receiving part 190 of FIG. 6 is inputted to the polarization controller 610. The polarization controller 610 controls a polarization state of the inputted polarization-multiplexed wave optical signal to match a polarization axis of the polarization separator 620. A control signal to the polarization controller 610 can be realized by various methods such that the control signal is generated based on outputs from the optical receiving part 630a and the optical receiving part 630b.

The polarization-multiplexed wave optical signal outputted from the polarization controller 610 is inputted to the polarization separator 620, and is separated by respectively extracting a TE polarization component and a TM polarization component which are two polarization components orthogonal to each other. Optical signals outputted from the polarization separator 620 are inputted to the optical receiving part 630a, and the optical receiving part 630b, and respectively output the output data signals O1, and O2.

The optical receiving part 190 of FIG. 6 may be constructed by the constitution shown in FIG. 4 which includes the polarization dependent photoelectric detecting part 510a and the analog phase locked loop 480, and the identifying-part 440 in the case where the optical modulating signal is constituted by the single polarized wave and the coherent detection by the analog PLL is adopted, or a constitution which includes a photoelectric detecting part adopting an intensity modulating system of NRA or RZ or the like, a photoelectric detecting part adopting a differential phase modulating system (DPSK, Differential Shift Keying), a polarization independent photoelectric detecting part of a photoelectric detecting part adopting a differential 4 value phase modulating system (DQPSK, Differential Quadrature Shift Keying), and the identifying part 440. The constitution of the polarization independent photoelectric detecting part described above is shown in, for example, JP-A-2008-263590.

Figure 7:
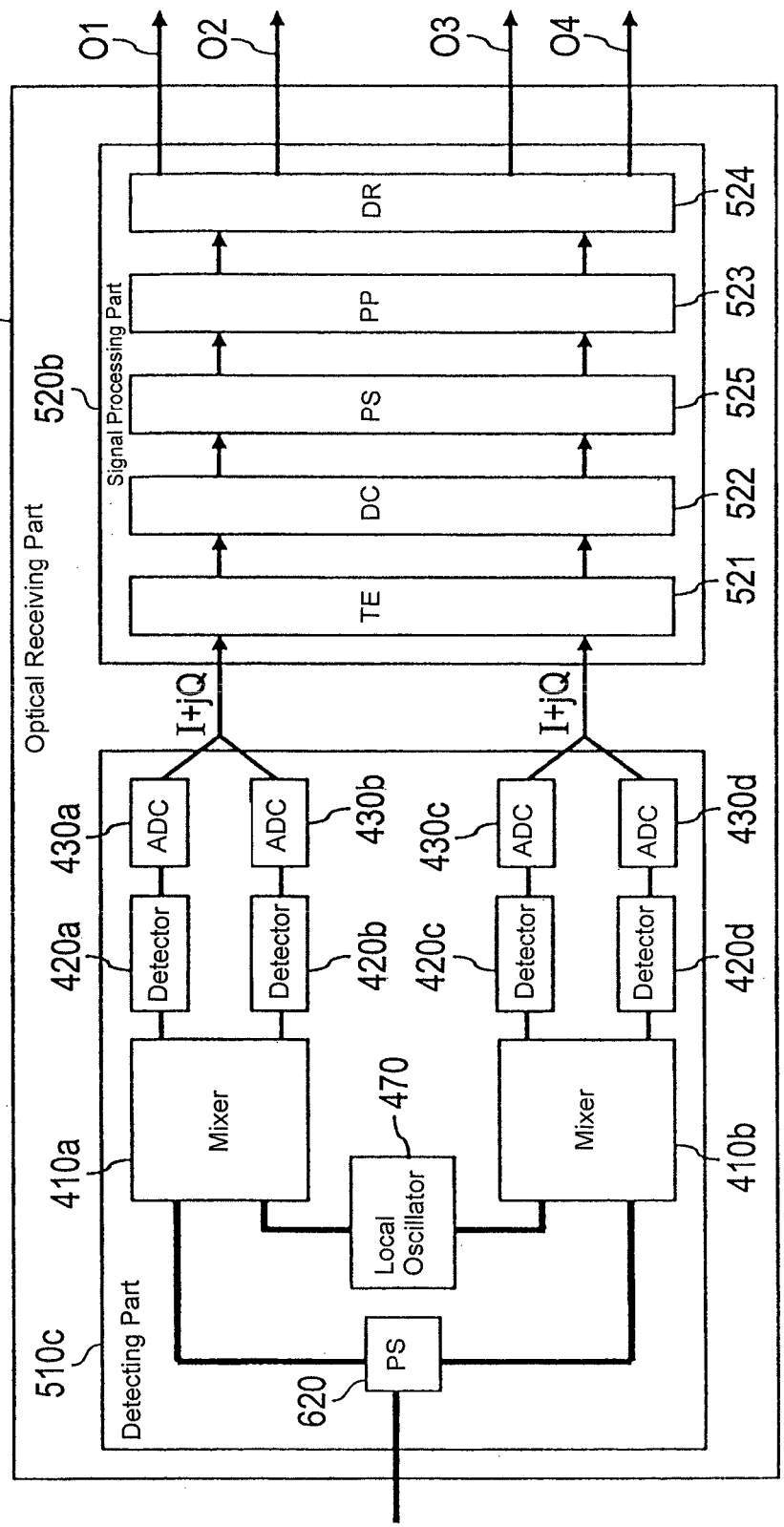
FIG. 7 is a diagram showing a constitution of a polarization dependent optical receiving part in a case where an optical modulating signal is constituted by a polarization-multiplexed wave and a digital coherent detection is adopted according to the first embodiment of the present invention.

FIG. 7 is a diagram of the constitution of the polarization dependent optical receiving part 190 in the case where the optical modulating signal is constituted by the polarization-multiplexed wave and the digital coherent detection is adopted.

As shown by the drawing, the polarization dependent optical receiving part 190 includes a polarization dependent photoelectric detecting part 510c, and a digital signal processing part 520b. The polarization dependent photoelectric detecting part 510c includes a polarization separator 620, an optical frequency mixer 410a, an optical frequency mixer 410b, the photoelectric detector 410a, the photoelectric detector 420b, a photoelectric detector 420c, a photoelectric detector 410d, the analog-to-digital converter 430a, the analog-to-digital converter 430b, an analog-to-digital converter 430c, an analog-to-digital converter 430d, and the local oscillator 470. The digital signal processing part 520b includes the timing extracting part 521, the dispersion compensating part 522, a polarization separating part 525, the phase predicting part 523, and the data recovering part 524.

A polarization-multiplexed optical signal inputted to the polarization dependent optical receiving part 190 of FIG. 7 is inputted to the polarization dependent photoelectric detecting part 510c. The polarization-multiplexed optical signal inputted to the polarization dependent photoelectric detecting part 510c is inputted to the polarization separator 620, extracted to two of polarization components orthogonal to each other, and the polarization components are respectively inputted to the optical frequency mixer 410a, and the optical frequency mixer 410b. The optical signals respectively inputted to the optical frequency mixer 410a, and the optical frequency mixer 410b are mixed with non-modulating (CW, Continuous Wave) light of the local oscillator 470 inputted to the optical frequency mixer 410a, and the optical frequency mixer 410b on the other hand in optical frequencies. The optical signals are outputted from the optical frequency mixer 410a as an optical signal of an I phase component and an optical signal of a Q phase in TE polarized waves, and respectively inputted to the photoelectric detector 420a and the photoelectric detector 420b. The optical signals are outputted from the optical frequency mixer 410b as an optical signal of an I phase component and an optical signal of a Q phase component in TM polarized waves, and respectively inputted to the photoelectric detector 420c and the photoelectric detector 420d. The optical signals inputted to the photoelectric detector 420a and the photoelectric detector 402b are respectively converted to electric signals of an I phase component and electric signals of a Q phase component in TE polarized waves, and respectively inputted to the analog-to-digital converter 430a and the analog-to-digital converter 430b. The optical signals inputted to the photoelectric detector 420c and the photoelectric detector 420d are respectively converted into an electric signal of an I phase component and an electric signal of a Q phase component in TM polarized waves, and respectively inputted to the analog-to-digital converter 430c and the analog-to-digital converter 430d. The electric signals inputted to the analog-to-digital converter 430a and the analog-to-digital converter 430b are respectively outputted as digital electric signals, and converted into a complex number symbol sequence in the TE polarized wave described as I+jQ. The electric signals inputted to the analog-to-digital converter 430c and the analog-to-digital converter 430d are respectively outputted as digital electric signals, and converted into a complex number symbol sequence in TM polarized wave described as I+jQ. The complex number symbol sequences in the respective polarized waves are inputted to the digital signal processing part 520b.

The respective complex number symbol sequences inputted to the digital signal processing part 520b are inputted to the timing extracting part 421, and the respective polarized waves are respectively subjected to a processing of extracting timings by a processing of a band pass filter in a frequency region or the like. Outputs from the timing extracting part 521 are inputted to the dispersion compensating part 522, and the respective waves are respectively subjected to a processing of wavelength dispersion compensation using an FIR (Finite Impulse Response) filter or the like. Outputs from the dispersion compensating part 522 are inputted to the polarization separating part 525, and separation of polarization of the polarization-multiplexed wave signal using a polarized wave separating algorithm of CMA (Constant Modulus Algorithm) or the like and compensation for PMD generated at the transmission line and the like are carried out. Outputs from the polarization separating part 525 are inputted to the phase predicting part 523, and the respective polarized waves are respectively subjected to compensation for the phase offset and the frequency offset using the phase predicting algorithm of VVA (Viterbi & Viterbi Algorithm) or the like. Outputs from the phase predicting part 523 are inputted to the data recovering part 524, and the respective polarized waves are respectively subjected to recovery to digital data. Output data signals O1, O2, O3, and O4 are outputted from the data recovering part 524.

Therefore, as has been described above, in the optical transmission and reception system according to the first embodiment, the polarization scrambling of the optical signal can be canceled by installing the polarization descrambler 180 acquiring the set information of the polarization scrambler 140, and carrying out polarization scramble in the direction inverse to the direction of the polarization scrambler 140 at the polarization scrambling frequency the same as that of the polarization scrambler 140 in front of the polarization dependent optical receiving part 190.

2. Second Embodiment

Next, an explanation will be given of an optical transmission and reception system according to a second embodiment.

Figure 8:
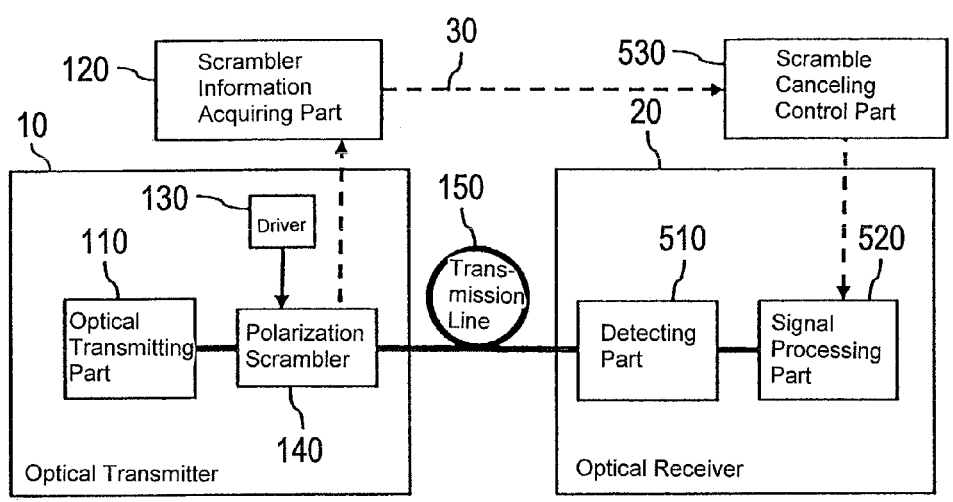
FIG. 8 is a diagram showing a constitution of an optical transmission and reception system according to a second embodiment of the present invention.

FIG. 8 is a diagram of a constitution of an optical transmission and reception system according to the second embodiment, of the present invention. As shown by the drawing, the optical transmission and reception system according to the second embodiment includes the optical transmitter 10 of transmitting an optical signal and the optical receiver 20 of receiving the optical signal, the polarization scrambler information acquiring part 120, a polarization scramble canceling signal processing part controlling part (polarization scramble canceling control part) 530, optical fiber transmission line 150, and the control network 30. The optical transmitter 10 and the optical receiver 20 are connected by the optical fiber transmission line 150 and the control network 30.

The optical transmitter 10 includes the optical transmitting part 110, the polarization scrambler driver 130, and the polarization scrambler 140.

The optical transmitting part 110 differs in a constitution thereof by whether an optical modulating signal to be transmitted is constituted by a single polarized wave, or a polarization-multiplexed wave. In a case where the transmitting optical signal is constituted by a single polarized wave, a constitution as shown in FIG. 2 described above is constructed, and in a case where the transmitting optical signal is constituted by a polarization-multiplexed wave, a constitution as shown by FIG. 3 described above is constructed. Details thereof are the same as those of the first embodiment, and therefore, an explanation thereof will be omitted.

The optical signal outputted from the optical transmitting part 110 of FIG. 8 is inputted to the polarization scrambler 140. The polarization scrambler 140 carries out polarization scramble of the inputted optical signal in accordance with a control signal generated from the polarization scrambler driver 130, and the optical signal subjected to polarization scramble is outputted from the polarization scrambler 140, and passes through the optical fiber transmission line 150 as a transmitted optical signal of the optical transmitter 10.

The control signal generated from the polarization scrambler driver 130 is a control signal having a predetermined frequency, and the frequency corresponds to a polarization scrambling frequency of the polarization scrambler 140. At this occasion, although the polarization scrambling frequency may be constituted by any value, it is pertinent to set the polarization scrambling frequency to a frequency higher than a frequency inherent to an FEC circuit achieving an effect of reducing PDL and a optical nonlinearity effect by polarization scramble. The polarization scrambler information acquiring part 120 acquires set information of the polarization scrambler 140 of carrying out polarization scramble (for example, a polarization scrambling frequency, a direction of a variation over time of polarization scramble and a pattern of the variation or the like) from the polarization scrambler 140, and the set information is transferred through the control network 30.

The optical receiver 20 of FIG. 8 includes a polarization dependent photoelectric detecting part 510, and a digital signal processing part 520 having the polarization scramble canceling signal processing part 526 of canceling polarization scrambling described later. Here, a constitution of adopting coherent detection can be used for the polarization dependent photoelectric detecting part 510.

The optical receiver 20 of FIG. 8 is inputted with the optical signal which is transmitted from the optical transmitter 10 and passes through the optical fiber transmission line 150. The optical signal inputted to the optical receiver 20 is inputted to the polarization dependent photoelectric detecting part 510, and is converted into an electric signal. The converted electric signal is inputted to the digital signal processing part 520, polarization scrambling is cancelled by adding the polarization scramble canceling signal processing part 526 to the series of operations of the digital signal processing parts 520a and 520b explained in reference to FIG. 5, and FIG. 7, and an output data signal is outputted.

Set information of the polarization scrambler 140 of carrying out polarization scramble is transferred from the polarization scrambler information acquiring part 120 through the control network 30, and the set information is received by the polarization scramble canceling signal processing part controlling part 530. The polarization, scramble canceling signal processing part controlling part 530 transfers the set information of the polarization scrambler 140 to the polarization scramble canceling signal processing part 526 described later at inside of the digital signal processing part 520. The polarization scramble canceling signal processing part 526 cancels polarization scrambling based on the set information of the polarization scrambler 140.

The polarization scramble canceling signal processing part controlling part 530 may be enabled to make access to the set information of the polarization scrambler 140 by preparing a database for storing the set information on the control network 30. Or, the set information of the polarization scrambler 140 may be inputted from the polarization scrambler information acquiring part 120 to the optical fiber transmission line 150 by a monitoring control optical signal (OSC, Optical Supervisor Call), and the set information may be acquired by receiving the monitoring control optical signal from the optical fiber transmission line 150 by the polarization scramble canceling signal processing part controlling part 530 which includes an optical detecting part. Further, the polarization scramble canceling signal processing part 526 may be operated by setting information of the polarization scrambler 140 previously at the polarization scramble canceling signal processing part 526 at inside of the digital signal processing part 520, or by installing polarization state monitoring part of monitoring the polarization state of the optical signal, the set information of the polarization scrambler 140 may be read from a variation in the polarization state.

Figure 9:
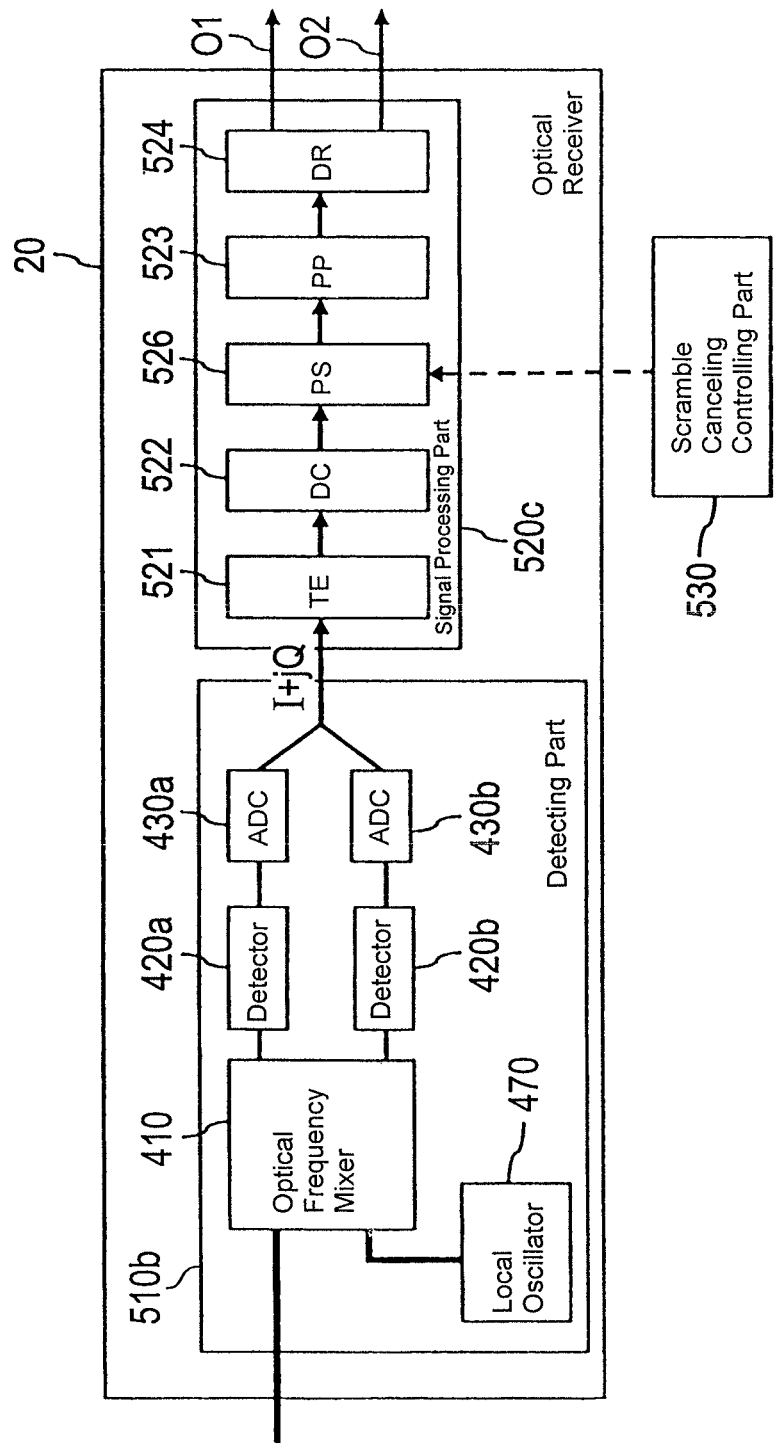
FIG. 9 is a diagram showing a constitution of an optical receiver in a case where an optical modulating signal is constituted by a single polarized wave and a digital coherent detection is adopted according to the second embodiment of the present invention.

FIG. 9 is a diagram of a constitution of the optical receiver 20 in a case where the optical modulating signal is constituted by a single polarized wave and the digital coherent detection is adopted.

As shown by the drawing, the optical receiver 20 includes the polarization dependent photoelectric detecting part 510b, and a digital signal processing part 250c. The polarization dependent photoelectric detecting part 510b includes the optical frequency mixer 410, the photoelectric detector 420a, the photoelectric detector 420b, the analog-to-digital converter 430a, the analog-to-digital converter 430b, and the local oscillator 470. The digital signal processing part 520c includes the timing extracting part 521, the dispersion compensating part 522, the polarization scramble canceling signal processing part 526, the phase predicting part 523, and the data recovering part 524.

An optical signal inputted to the optical receiver of FIG. 9 is inputted to the polarization dependent photoelectric detecting part 510b. The optical signal inputted to the polarization dependent photoelectric detecting part 510b is inputted to the optical frequency mixer 410, and is mixed with non-modulating (CW, Continuous Wave) light of the local oscillator 470 inputted to the optical frequency mixer 410 on one hand in optical frequencies. An optical signal of an I phase component and an optical signal of a Q phase component are outputted from the optical frequency mixer 410, and respectively inputted to the photoelectric detector 410a and the photoelectric detector 410b. The optical signals inputted to the photoelectric detector 420a and the photoelectric detector 420b are respectively converted into an electric signal of an I phase component and an electric signal of a Q phase component, and respectively inputted to the analog-to-digital converter 430a and the analog-to-digital converter 430b. The electric signals inputted to the analog-to-digital converter 430a and the analog-to-digital converter 430b are respectively outputted as digital electric signals, and converted into a complex number symbol sequence described as I+jQ. The complex number symbol sequence is inputted to the digital signal processing part 520c.

The complex number symbol sequence inputted to the digital signal processing part 520c is inputted to the timing extracting part 521, at which a processing of extracting a timing by a processing of a band pass filter in a frequency region or the like is carried out. An output from the timing extracting part 521 is inputted to the dispersion compensating part 522, at which a processing of compensating for a dispersion in a wavelength using an FIR (Finite Impulse Response) filter or the like is carried out. An output from the dispersion compensating part 522 is inputted to the polarization scramble canceling signal processing part 526, and polarization scrambling of the signal is canceled by an operation described later. An output from the polarization scramble canceling signal processing part 526 is inputted to the phase predicting part 523, at which a compensation for a phase offset and a frequency offset using a phase predicting algorithm of VVA (Viterbi & Viterbi Algorithm) or the like is carried out. An output from the phase predicting part 523 is inputted to the digital recovering part 524 and the recovery to a digital data is carried out. The output data signals O1, and O2 are outputted from the data recovering part 524.

A detailed explanation will be given of an operation of the polarization scramble canceling signal processing part 526. For simplicity, a description will be given of a case of carrying out polarization rotation in one direction. First, the polarization scramble canceling signal processing part 526 receives set information of the polarization scrambler 140 from the polarization scramble canceling signal processing part controlling part 530, and forms a matrix of Jones Matrix for canceling polarization scrambling of a signal. The matrix of Jones Matrix is a matrix for representing a transfer function and a polarization state of an optical signal.

The matrix of Jones Matrix representing a state of polarization rotation of an optical signal becomes as follows.

$$\begin{pmatrix} \cos\theta & -\sin\theta \\ \sin\theta & \cos\theta \end{pmatrix} \quad \text{[Equation 1]}$$

At this occasion, notation $\theta$ designates a polarization rotation angle of an optical signal when rotated in the counterclockwise direction. When polarization scrambling of an optical signal by the polarization scrambler 140 is represented by the matrix of Jones Matrix, the polarization rotation angle is changed time-sequentially, and therefore, the following matrix is derived.

$$S = \begin{pmatrix} \cos(2\pi ft + \theta_0) & -\sin(2\pi ft + \theta_0) \\ \sin(2\pi ft + \theta_0) & \cos(2\pi ft + \theta_0) \end{pmatrix} \quad \text{[Equation 2]}$$

Here, notation S designates the matrix of Jones Matrix representing the polarization scrambling by the polarization scrambler 140, notation f designates a polarization scrambling frequency of the polarization scrambler 140, notation t designates time when a signal is detected by the polarization dependent photoelectric detecting part 510b, and notation $\theta_0$ designates an initial phase. Therefore, canceling of the polarization scrambling can be carried out by preparing an inverse matrix of the matrix S of Jones Matrix representing the polarization scrambling, and multiplying the inverse matrix by complex number symbols which are entitled as a receiving signal. Therefrom, the matrix of Jones Matrix of canceling the polarization scrambling becomes as follows.

$$T = S^{-1} = \begin{pmatrix} \cos(2\pi ft + \theta_0) & \sin(2\pi ft + \theta_0) \\ -\sin(2\pi ft + \theta_0) & \cos(2\pi ft + \theta_0) \end{pmatrix} \quad \text{[Equation 3]}$$

Here, notation T designates a matrix of Jones Matrix of canceling the polarization scrambling, at the same time, the inverse matrix of the matrix of Jones Matrix representing the polarization scrambling by the polarization scrambler 140. Here, the polarization scrambling frequency f or the like may be acquired from the set information of the polarization scrambler 140.

Although in the above-described, the description has been given of the case of carrying out the polarization rotation in one direction for simplicity, a variation over time of polarization is not limited thereby, but there are a variety of variation patterns of a periodic function of a sin wave or the like. The polarization scrambler 140 can realize all of the variation patterns, and the polarization scrambling can be cancelled by using the matrix of Jones Matrix in accordance with the variation patterns.

Therefore, an input to the polarization scramble canceling signal processing part 526 can cancel a state of polarization scramble by a principle of operating the polarization scramble canceling signal processing part 526 as described above. Further, an output of the polarization scramble canceling signal processing part 526 is outputted as in a state of canceling polarization scramble.

The polarization scramble canceling signal processing part 526 needs a timing of starting to calculate the matrix of Jones Matrix of canceling the polarization scrambling, and therefore, it is necessary to acquire the timing. A measure of resolving the problem can be realized by various methods such that while measuring an average over time of a bit error rate (BER, Bit Error Rate) during a time period of a polarization scramble period in correspondence with an inverse number of the polarization scrambling frequency of the polarization scrambler 140, the averages are delivered to the polarization scramble canceling signal processing part controlling part 530, at a timing at which values of these become small, the polarization scramble canceling signal processing part controlling part 530 makes the polarization scramble canceling signal processing part 526 start the calculation of the polarization scramble canceling signal processing part 526.

Further, there is a case where a shift of a timing of carrying out polarization scramble canceling by the polarization scramble canceling signal processing part 526 is brought about when a variation in the polarization scrambling frequency of the polarization scrambler 140 is brought about, or when polarization scramble canceling is carried out in a state of not acquiring the set information of the polarization scrambler 140. A measure of resolving the problem can be realized by various methods such that while measuring a bit error rate (BER, Bit Error Rate) or a deterioration in an eye opening of an eye pattern or the like, the bit error rate or the deterioration is delivered to the polarization scramble canceling signal processing part controlling part 530, and the shift of the timing of the polarization scramble canceling signal processing part 526 is adjusted such that values of theses become small. Further, measurement of the bit error rate and the eye opening of the eye pattern can be realized by pertinent devices.

Figure 10:
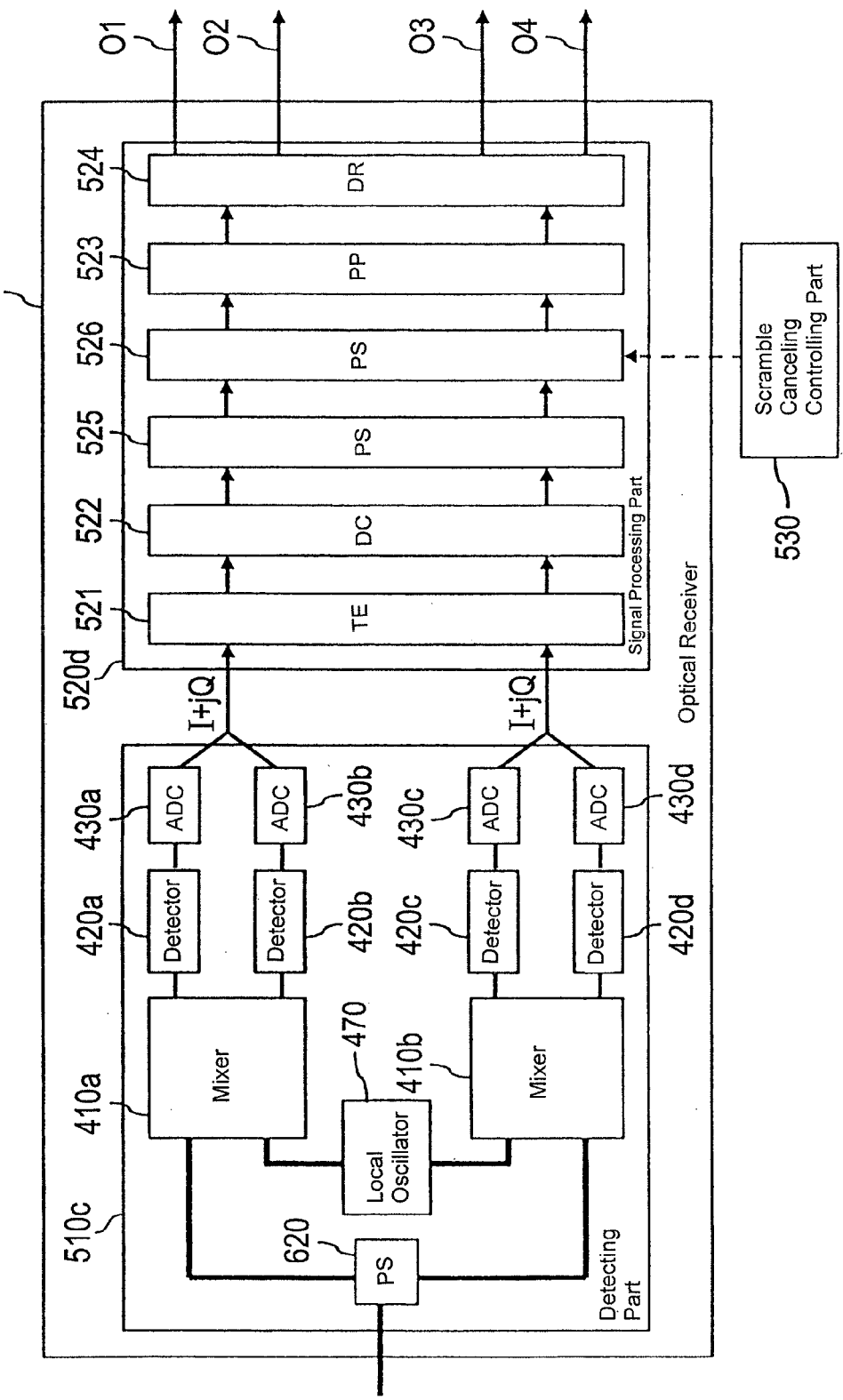
FIG. 10 is a diagram showing a constitution of an optical receiver in a case where the optical modulating signal is constituted by a polarization-multiplexed wave and a digital coherent detection is adopted according to the second embodiment of the present invention.

FIG. 10 is a diagram of a constitution of the optical receiver 20 in a case where an optical modulated signal is a polarization-multiplexed wave and the digital coherent detection is adopted.

As shown by the drawing, the optical receiver includes the polarization dependent photoelectric detecting part 510c, and a digital signal processing part 520d. The polarization dependent photoelectric detecting part 510c includes the polarization separator 620, the optical frequency mixer 410a, the optical frequency mixer 410b, the photoelectric detector 420a, the photoelectric detector 420b, the photoelectric detector 420c, the photoelectric detector 420d, the analog-to-digital converter 430a, the analog-to-digital converter 430b, the analog-to-digital converter 430c, the analog-to-digital converter 430d, and the local oscillator 470. The digital signal processing part 520d includes the timing extracting part 521, the dispersion compensating part 522, the polarization separator 525, the polarization scramble canceling signal processing part 526, the phase predicting part 523, and the data recovering part 524.

A polarization-multiplexed optical signal inputted to the optical receiver 20 of FIG. 10 is inputted to the polarization dependent photoelectric detecting part 510c. The polarization-multiplexed optical signal inputted to the polarization dependent photoelectric detecting part 510c is inputted to the polarization separator 620, extracted into two polarization components orthogonal to each other, and the polarization components are respectively inputted to the optical frequency mixer 410a, and the optical frequency mixer 410b. The optical signals respectively inputted to the optical frequency mixer 410a, and the optical frequency mixer 410b are mixed with non-modulating wave (CW, Continuous Wave) light of the local oscillator 470 which is inputted to the optical frequency mixer 410a, and the optical frequency mixer 410b on the other hand in optical frequencies. An optical signal of an I phase component and an optical signal of a Q phase component in TE polarized waves are outputted from the optical frequency mixer 410a, and respectively inputted to the photoelectric detector 420a and the photoelectric detector 420b. An optical signal of an I phase component and an optical signal of a Q phase component in TM polarized waves are outputted from the optical frequency mixer 410b, and respectively inputted to the photoelectric detector 420c and the photoelectric detector 420d. The optical signals inputted to the photoelectric detector 420a and the photoelectric detector 420b are respectively converted into an electric signal of an I phase component and an electric signal of a Q phase component in TE polarized waves, and the electric signals are respectively inputted, to the analog-to-digital converter 430a and the analog-to-digital converter 430b. The optical signals inputted to the photoelectric detector 420c and the photoelectric detector 420d are respectively converted into an electric signal of an I phase component and an electric signal of a Q phase component in TM polarized waves, and respectively inputted to the analog-to-digital converter 430c and the analog-to-digital converter 430d. The electric signals inputted to the analog-to-digital converter 430a and the analog-to-digital converter 430b are respectively outputted as the digital electric signals, and converted to a complex number symbol sequence in TE polarized wave described as I+jQ. The electric signals inputted to the analog-to-digital converter 430c and the analog-to-digital converter 430d are respectively outputted as the digital electric signals, and converted into a complex number symbol sequence in TM polarized wave described as I+jQ. The complex number symbol sequences in the respective polarized waves are inputted to the digital signal processing part 520d.

The respective complex number symbol sequences inputted to the digital signal processing part 520d are inputted to the timing extracting part 521, and the respective polarized waves are respectively subjected to a processing of extracting a timing by a processing of a band pass filter in a frequency region or the like. An output from the timing extracting part 521 is inputted to the dispersion compensating part 522, and the respective polarized waves are respectively subjected to a processing of wavelength dispersion compensation using an FIR (Finite Impulse Response) filter or the like. An output from the dispersion compensating part 522 is inputted to the polarization separator 525, where polarization separation of a polarization-multiplexed signal using polarization separation algorithm of CMA (Constant Modulus Algorithm) or the like and compensation for PMD generated at the transmission line are carried out. An output from the polarization separating part 525 is inputted to the polarization scramble canceling signal processing part 526, where polarization scrambling of a signal is cancelled by the polarization scramble canceling signal processing part 526 described above. An output from the polarization scramble canceling signal processing part 526 is inputted to the phase predicting part 523, and respective polarized waves are respectively subjected to compensation for phase offset and frequency offset using a phase predicting algorithm of VVA (Viterbi & Viterbi Algorithm) or the like. An output from the phase predicting part 523 is inputted to the data recovering part 524, and respective polarized waves are recovered to digital data. The output data signals O1, O2, O3, and O4 are outputted from the data recovering part 524.

Here, an explanation will be given of reason of carrying out an operation of the polarization scramble canceling signal processing part 526 after an operation of the polarization separating part 525. A matrix of Jones Matrix representing a polarization state of an optical signal outputted from the optical transmitter 10 is designated by notation A, a matrix of Jones Matrix representing polarization scrambling by the polarization scrambler 140 is designated by notation S, and a matrix of Jones Matrix representing a dispersion in a wavelength by the optical fiber transmission line 150 or a deterioration in an optical signal by PMD or the like is designated by notation H. Then, a matrix of Jones Matrix representing a polarization state of an optical signal inputted to the optical receiver becomes as follows.

$$P = HSA \quad \text{[Equation 4]}$$

Here, notation P designates the matrix of Jones Matrix representing the polarization state of the optical signal inputted to the optical receiver 20. Further, in order to obtain an original output from the optical transmitter 10 by canceling the deterioration in the optical signal by the optical fiber transmission line 150, and the polarization scrambling on a receiving side, the following matrix needs to multiply in mathematical consideration.

$$Q = S^{-1} H^{-1} \quad \text{[Equation 5]}$$

Here, notation Q designates a matrix of Jones Matrix for canceling the deterioration by the optical fiber transmission Line 150, and the polarization scrambling of the optical signal inputted to the optical receiver 20. Therefore, it is known from the equation that it is necessary to cancel the polarization scrambling after previously canceling the deterioration by the optical fiber transmission line 150. From the above-described, the polarization scramble canceling signal processing part 516 of canceling the polarization scrambling is installed after the dispersion compensating part 522 of carrying out compensation for wavelength dispersion and the polarization separating part 525 of carrying out compensation for PMD and polarization separation.

Further, when PDT, is generated to the polarization-multiplexed wave optical signal, one polarization component of the polarization-multiplexed wave optical signal is attenuated, and the signal is received without maintaining an orthogonality of two polarization components between the polarization-multiplexed wave optical signals. However, an amount of an error signal generated by the PDL may be detected at inside of the digital signal processing part 525d, an average over time may be calculated only during a time period of the polarization scramble period in correspondence with the inverse number of the polarization scrambling frequency, and the polarization separating part 525 may be controlled by utilizing a value of the average over time. Thereby, an influence of PDL in the polarization-multiplexed wave optical signal can be alleviated.

Therefore, as has been described above, in the optical transmission and reception system according to the second embodiment, canceling of the polarization scrambling can be realized by acquiring the set information of the polarization scrambler 140, and calculating to prepare the matrix of Jones Matrix of canceling the polarization scrambling at inside of the digital signal processing part 520d.

3. Third Embodiment

Next, an explanation will be given of a wavelength multiplexing optical transmission and reception system according to a third embodiment of the present invention.

Figure 11:
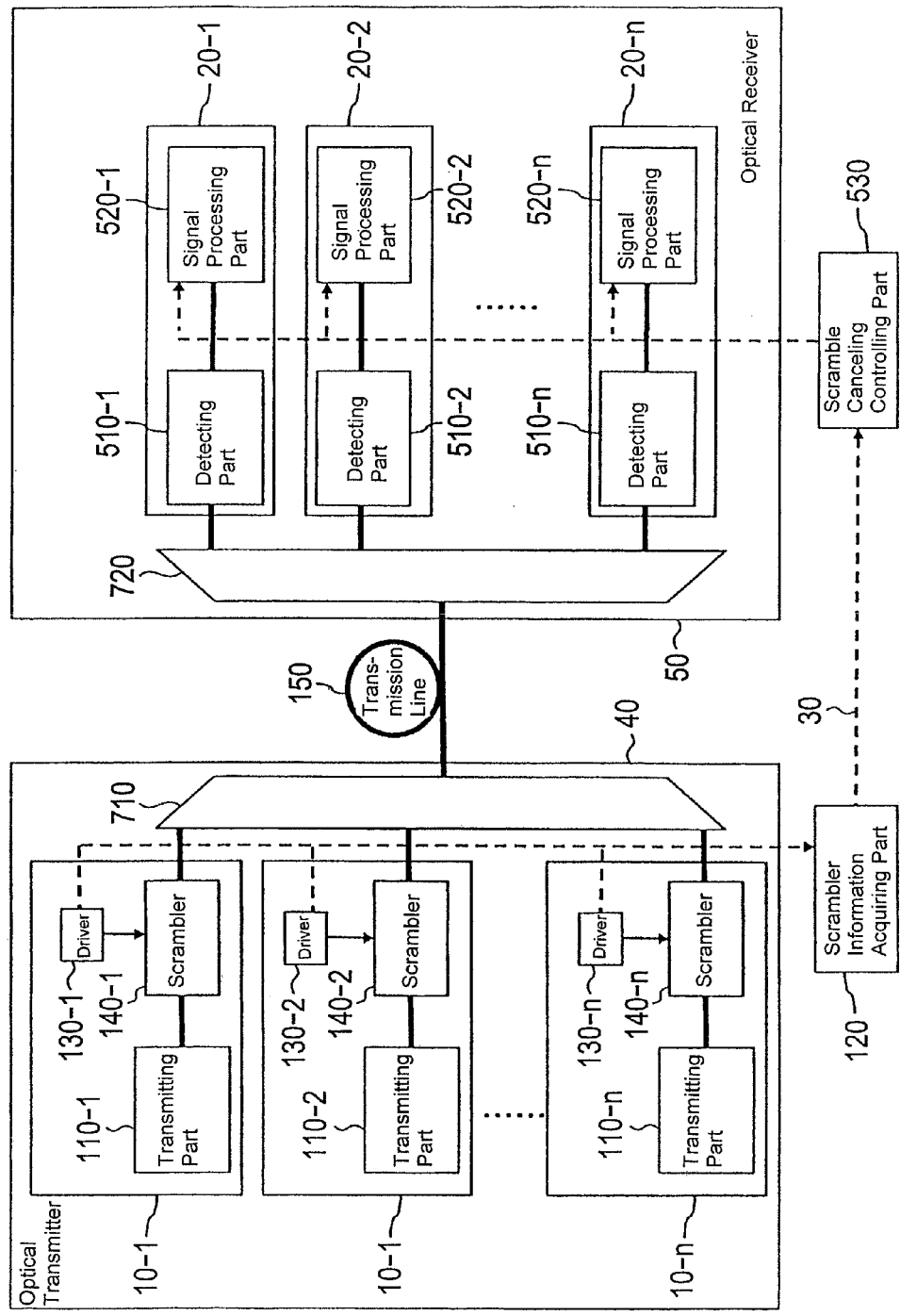
FIG. 11 is a diagram showing a constitution of an optical transmission and reception system according to a third embodiment of the present invention.

FIG. 11 is a diagram of a constitution of the wavelength multiplexing optical transmission and reception system according to the third embodiment of the present invention. As shown by the drawing, the wavelength multiplexing optical transmission and reception system according to the third embodiment includes a wavelength multiplexing optical trans fitter 40 of transmitting a wavelength-multiplexed optical signal, a wavelength multiplexing optical receiver 50 of receiving the wavelength-multiplexed optical signal, the polarization scrambler information acquiring part 120, the polarization scramble canceling signal processing part controlling part 530, the optical fiber transmission line 150, and the control network 30. The wavelength multiplexing optical transmitter 40 and the wavelength multiplexing optical receiver 50 are connected by the optical fiber transmission line 150 and the control network 30.

The wavelength multiplexing optical transmitter 40 includes plural optical transmitters 10 (−1, −2, . . . , −n) and an optical multiplexer 710. The optical transmitter 10 (−1, −2, . . . , −n) include optical transmitting parts 110 (−1, −2, . . . , −n), polarization scrambler drivers 130 (−1, −2, . . . , −n) and polarization scramblers 140 (−1, −2, . . . , −n)

The optical transmitting parts 110 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, a constitution as in FIG. 2 described above is constructed, and in a case where the transmitted optical signal is constituted by the polarization-multiplexed wave, a constitution as in FIG. 3 described above is constructed.

Optical signals outputted from the optical transmitting parts 110 (−1, −2, . . . , −n) of FIG. 11 are respectively inputted to the polarization scramblers 140 (−1, −2, . . . , −n). The polarization scramblers 140 (−1, −2, . . . , −n) carry out polarization scramble of the inputted optical signal in accordance with control signals generated from the polarization scrambler drivers 130 (−1, −2, . . . , −n), and optical signals subjected to polarization scramble are outputted from the polarization scramblers 140 (−1, −2, . . . , −n) as optical signals of the optical transmitters 10 (−1, −2, . . . , −n). The optical signals respectively outputted from the optical transmitters 10 (−1, −2, . . . , −n) are subjected to wavelength multiplexing by the optical multiplexer 710, and pass through optical fiber transmission line 150 as transmitted polarization-multiplexed optical signals of the wavelength multiplexing transmitter 40.

The control signals generated from the polarization scrambler drivers 130 (−1, −2, . . . , −n) are control signals having predetermined frequencies, and the frequencies correspond to polarization scramble frequencies of the polarization scramblers 140 (−1, −2, . . . , −n). At this occasion, although the respective polarization scramble frequencies may be constituted by any values, it is pertinent to set the respective polarization scramble frequencies to frequencies higher than a frequency inherent to an FEC circuit achieving an effect of reducing PDL by polarization scramble and the optical nonlinearity effect. The polarization scrambler information acquiring part 120 acquires set information (for example, a polarization scrambling frequency, a direction of a variation over time of polarization scramble, and a pattern of the variation or the like) of the polarization scramblers 140 (−1, −2, . . . , −n) of carrying out polarization scramble from the respective polarization scramblers 140 (−1, −2, . . . , −n), and transfers the set information through the control network 30. A constitution of canceling polarization scramble on a receiving side can be made to correspond to polarization scramble on a transmitting side. For example, set information of the polarization scrambler 140-1 may be informed to a digital signal processing part 520-1 and set information of the polarization scrambler 140-2 may be informed to a digital signal processing part 520-2.

At this occasion, polarization scramble frequencies of the polarization scramblers 140 (−1, −2, . . . , −n) may be the same frequency, or may be frequencies which differ from each other. In the case of the frequencies which differ from each other, in comparison with the case in which the polarization scramble frequencies are the same, a probability by which polarizations of contiguous channels in respective optical signals coincide with each other becomes low, and therefore, a reduction in the optical nonlinearity effect can be strengthened.

The wavelength multiplexing optical receiver 50 of FIG. 11 includes plural optical receivers 20 ((−1, −2, . . . , −n), and an optical demultiplexer 720. The optical receivers 20 (−1, −2, . . . , −n) include polarization dependent photoelectric detecting parts 510 (−1, −2, . . . , −n), and digital signal processing parts 520 (−1, −2, . . . , −n) having the polarization scramble canceling signal processing parts 520 of canceling polarization scrambling.

The optical receivers 20 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, a constitution as in FIG. 9 described above is constructed, and in a case where the transmitted optical signal is constituted by the polarization-multiplexed wave, a constitution as in FIG. 10 described above is constructed.

A wavelength-multiplexed optical signals which is transmitted from the wavelength multiplexing optical transmitter 40 and passes through the optical fiber transmission line 150 is inputted to the wavelength multiplexing optical receiver 50 of FIG. 11, and inputted to the optical demultiplexer 720. The wavelength-multiplexed optical signal passing through the optical demultiplexer 720 is demultiplexed, and respectively inputted to the optical receivers 20 (−1, −2, . . . , −n). The optical signals inputted to the optical receivers 20 (−1, −2, . . . , −n) are inputted to the polarization dependent photoelectric detecting parts 510 (−1, −2, . . . , −n), and converted into electric signals. The converted electric signals are inputted to the digital signal processing parts 520 (−1, −2, . . . , −n), and output data signals are outputted by carrying out series of operations of the digital signal processing parts 520 (−1, −2, . . . , −n) having the polarization scramble canceling signal processing parts 526 explained in reference to FIG. 9, and FIG. 10.

Set information of the polarization scramblers 140 (−1, −2, . . . , −n) of carrying out polarization scramble are transferred from the polarization scrambler information acquiring part 120 through, for example, the control network 130, and the set information is received by the polarization scramble canceling signal processing part controlling part 130. The polarization scramble canceling signal processing part controlling part 530 transfers set information of the polarization scramblers 140 (−1, −2, . . . , −n) to the polarization scramble canceling signal processing parts 526 (−1, −2, . . . , −n) at insides of the digital signal processing parts 520 (−1, −2, . . . , −n). The polarization scramble signal canceling signal processing parts 526 (−1, −2, . . . , −n) cancel polarization scrambling based on the set information of the polarization scramblers 140 (−1, −2, . . . , −n).

The polarization scramble canceling signal processing part controlling part 530 may be made to be able to make access to the set information of the polarization scramblers 140 (−1, −2, . . . , −n) by preparing a database for storing the set information on the control network 30. Or, the set information may be acquired by inputting the set information of the polarization scramblers 140 (−1, −2, . . . , −n) from the polarization scrambler information acquiring part 120 to the optical fiber transmission line 150 by a monitoring control optical signal (OSC, Optical Supervisor Call) and receiving the monitoring control optical signal from the optical fiber transmission line 150 by the polarization scramble canceling signal processing part controlling part 530 which includes an optical detecting part. Further, by previously setting information of the polarization scramblers 140 (−1, −2, . . . , −n) at the polarization scramble canceling signal processing parts 526 (−1, −2, . . . , −n) at insides of the digital signal processing parts 520, the polarization scramble canceling signal processing parts 526 (−1, −2, . . . , −n) may be operated. By installing a polarization state monitoring part of monitoring polarization states of optical signals, set information of the polarization scramblers 140 (−1, −2, . . . , −n) may be read from variations in the polarization states.

Although according to the embodiment, the constitution of the wavelength multiplexing optical transceiver using the optical receiver shown in the second embodiment is shown, there may be constructed a constitution of a wavelength multiplexing optical transceiver using the optical receiver shown in the first embodiment.

Therefore, as has been described above, according to the wavelength multiplexing optical transmission and reception system of the third embodiment, the reduction in the optical nonlinearity effect can be strengthened by multiplexing the optical signals from the optical transmitters 10 (−1, −2, . . . , −n) of carrying out polarization scramble by the polarization scramble frequencies which differ from each other, and transmitting the optical signals as a polarization-multiplexed optical signal from the wavelength multiplexing optical transmitter 140.

4. Fourth Embodiment

Successively, an explanation will be given of a wavelength multiplexing optical transmission and reception system according to a fourth embodiment of the present invention.

Figure 12:
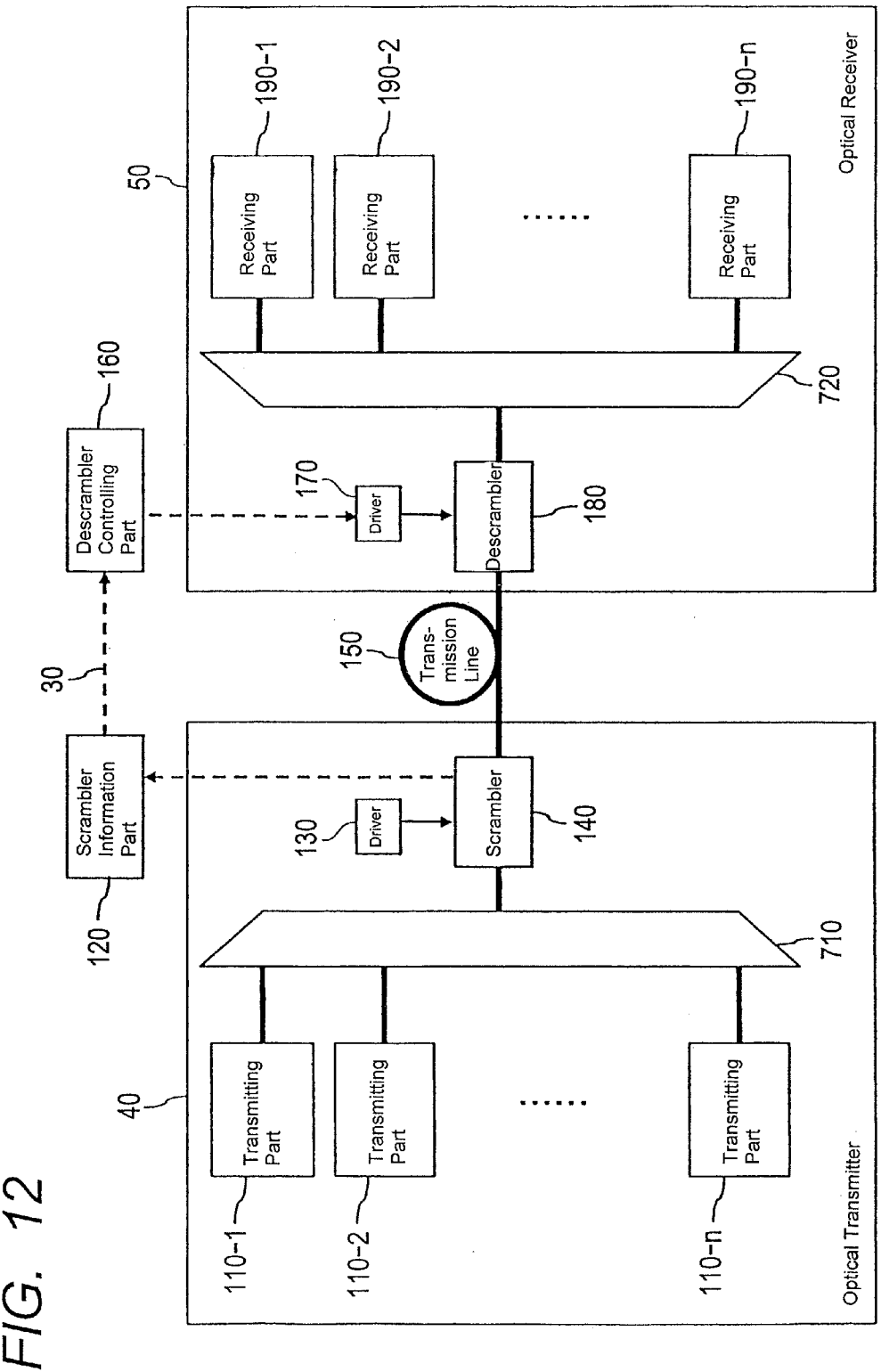
FIG. 12 is a diagram showing a constitution of an optical transmission and reception system according to a fourth embodiment of the present invention.

FIG. 12 is a diagram of a constitution of the wavelength multiplexing optical transmission and reception system according to the fourth embodiment of the present invention As shown by the drawing, the wavelength multiplexing optical transmission and reception system according to the fourth embodiment includes the wavelength multiplexing optical transmitter 40 of transmitting a polarization-multiplexed optical signal, a wavelength multiplexing optical receiver 50 of receiving the polarization-multiplexed optical signal, the polarization scrambler information acquiring part 120, the polarization descrambler controlling part 160, the optical fiber transmission line 150, and the control network 30. The wavelength multiplexing optical transmitter 40 and the wavelength multiplexing optical receiver 50 are connected by the optical fiber transmission line 150 and the control network 30.

The wavelength multiplexing optical transmitter 40 includes the plural optical transmitting parts 110 (−1, −2, . . . , −n) the optical multiplexer 710, the polarization scrambler driver 130, and the polarization scrambler 140.

The optical transmitting parts 110 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, the constitution as in FIG. 2 described above is constructed, and in a case where the transmitted optical signal is constituted by the polarization-multiplexed wave, the constitution as in FIG. 3 described above is constructed.

Optical signals outputted from the optical transmitting parts 110 (−1, −2, . . . , −n) of FIG. 12 are respectively inputted to the optical multiplexer 710, and a multiplexed optical signal is outputted therefrom. The polarization-multiplexed optical signal outputted from the optical multiplexer 710 is inputted to the polarization scrambler 140. The polarization scrambler 140 carries out polarization scramble of the inputted optical signal in accordance with the control signal generated from the polarization scrambler driver 130, a polarization-multiplexed optical signal subjected to polarization scramble is outputted from the polarization scrambler 140, and passes through the optical fiber transmission line 150 as a transmitted optical signal of the wavelength multiplexing optical transmitter 40.

The control signal, generated from the polarization scrambler driver 130 is a control signal having a predetermined frequency, and the frequency corresponds to a polarization scrambling frequency of the polarization scrambler 140. At this occasion, although the polarization scrambling frequency may be of any value, it is pertinent to set the polarization scrambling frequency to a frequency higher than a frequency inherent to an FEC circuit achieving an effect of reducing PDL by polarization scramble and the optical nonlinearity effect. The polarization scrambler information acquiring part 120 acquires set information (for example, a polarization scrambling frequency, a direction of a variation over time of polarization scramble, and a pattern of the variation or the like) of the polarization scrambler 140 carrying out the polarization scramble, and transfers the set information through the control network 30.

The wavelength multiplexing optical receiver 50 of FIG. 12 includes the polarization descrambler driver 170, the polarization descrambler 180, the optical demultiplexer 720, and plural polarization dependent optical receiving parts 190 (−1, −2, . . . , −n).

The polarization dependant optical receiving parts 190 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, constitutions as in FIG. 4 and FIG. 5 described above are constructed, and in a case where the transmitted optical signal is constituted by the polarization-multiplexed wave, constitutions as in FIG. 6 and FIG. 7 described above are constructed.

A polarization-multiplexed optical signal which is transmitted from the wavelength multiplexing optical transmitter 40 and passes through the optical fiber transmission line 150 is inputted to the wavelength optical receiver 50 of FIG. 12, and inputted to the polarization descrambler 180. The polarization descrambler 180 subjects the polarization-multiplexed optical signal which has been subjected to polarization scramble by the polarization scrambler 140 to polarization scramble at a polarization scrambling frequency set by the polarization scrambler 140 in a direction inverse to a direction of rotation of the polarization scramble at the polarization scrambler 140, and cancels polarization scrambling of the wavelength-multiplexed optical signal which has been subjected to polarization scramble by the polarization scrambler 140. The wavelength-multiplexed optical signal the polarization scrambling of which is canceled by the polarization descrambler 180 is demultiplexed by the optical demultiplexer 720, and demultiplexed optical signals are respectively received by the polarization dependent optical receiving part 190 (−1, −2, . . . , −n).

A control signal generated from the polarization descrambler driver 170 is a control signal having a predetermined frequency, and the frequency corresponds to the polarization scrambling frequency of the polarization scrambler 140, and is set so as to carry out polarization scramble in a direction inverse to a direction of a variation over time of the polarization scrambler 140. Set information (for example, a polarization scrambling frequency, a direction of a variation over time of polarization scramble, and a pattern of the variation or the like) of the polarization scrambler 140 carrying out polarization scramble is transferred from the polarization scrambler information acquiring part 120 through the control network 30, and the set information is received by the polarization descrambler controlling part 160. The polarization descrambler controlling part 160 operates the polarization descrambler driver 170 based on the set information.

The polarization descrambler controlling part 160 may be made to be able to make access to the set information of the polarization scrambler 140 by preparing a database for storing the set information on the control network 30. Or, the set information of the polarization scrambler 140 may be inputted to the optical fiber transmission line 150 by a monitoring control optical signal (OSC, Optical Supervisor Call) from the polarization scrambler information acquiring part 120, and the set information may be acquired by receiving the monitoring control optical signal from the optical fiber transmission line 150 by the polarization descrambler controlling part 160 which includes an optical detecting part. Further, the polarization descrambler 180 may be operated by previously setting information of the polarization scrambler 140 at the polarization descrambler driver 170. Or, a polarization state monitoring part of monitoring a polarization state of an optical signal may be installed, and the set information of the polarization scrambler 140 may be read from a variation of the polarization state. Further, while measuring a bit error rate (BER, Bit Error Rate) or a deterioration in an eye opening or the like by the polarization dependent optical receiving parts 190 (−1, −2, . . . , −n) without acquiring the set information of the polarization scrambler 140, the bit error rate or the deterioration in the eye opening may be delivered to the polarization descrambler 170, and a polarization scrambling frequency of the polarization descrambler 180 may be adjusted such that values of these become small. At this occasion, it is necessary to set a direction of rotation of the polarization descrambler 180 in a direction inverse to that of the polarization scrambler 140.

Therefore, as has been described above, according to the wavelength multiplexing optical transmission and reception system of the fourth embodiment, the number of the polarization scramblers 140 and the number of the polarization descramblers 180 can be reduced by summarizing respective optical signals from the optical transmitting parts 110 (−1, −2, . . . , −n) into the polarization-multiplexed optical signal multiplexed by the optical multiplexer 710, constituting polarization scrambling by the single polarization scrambler 140, thereafter, canceling the polarization scrambling by the single polarization descrambler 180.

5. Fifth Embodiment

Next, an explanation will be given of a wavelength multiplexing optical transmission and reception system according to a fifth embodiment of the present invention.

Figure 13:
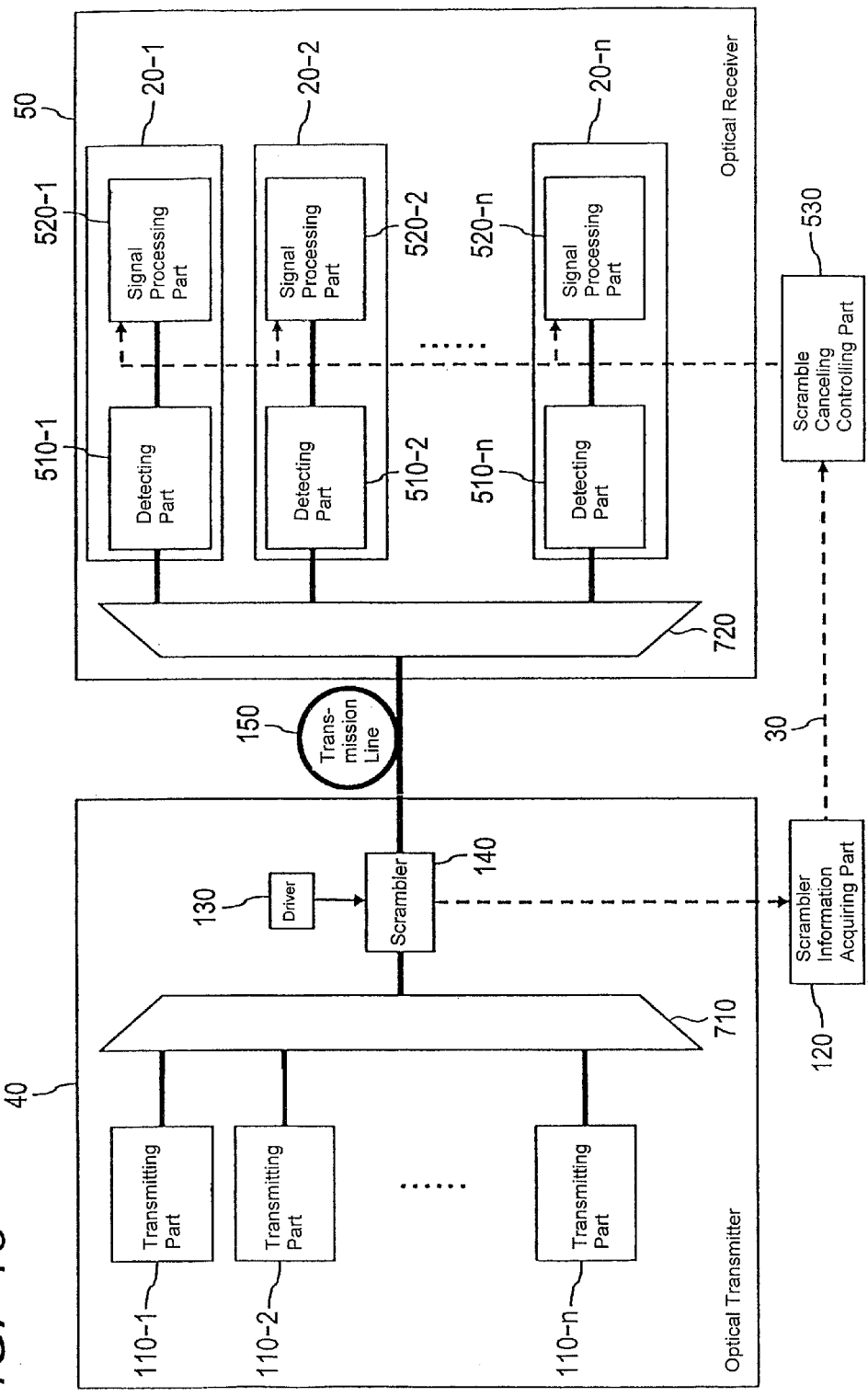
FIG. 13 is a diagram showing a constitution of an optical transmission and reception system according to a fifth embodiment of the present invention.

FIG. 13 is a diagram of a constitution of the wavelength multiplexing optical transmission and reception system according to the fifth embodiment of the present invention. As shown by the drawing, the wavelength multiplexing optical transmission and reception system includes the wavelength multiplexing transmitter 40 of transmitting a polarization-multiplexed optical signal, the wavelength multiplexing optical receiver 50 of receiving the polarization-multiplexed optical signal, the polarization scrambler information acquiring part 120, the polarization scramble canceling signal processing part controlling part 530, the optical fiber transmission line 150, and the control network 30. The wavelength multiplexing optical transmitter 40 and the wavelength multiplexing optical receiver 50 are connected by the optical fiber transmission line 150 and the control network 30.

The wavelength multiplexing optical transmitter 40 includes the plural optical transmitting parts 110 (−1, −2, . . . , −n), the optical multiplexer 710, the polarization scrambler driver 130, and the polarization scrambler 140.

The optical transmitting parts 110 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, a constitution as shown in FIG. 2 described above is constructed, and in a case where the transmitted optical signal is constituted by a polarization-multiplexed wave, a constitution as in FIG. 3 described above is constructed.

Optical signals outputted from the optical transmitting parts 110 (−1, −2, . . . , −n) are multiplexed by the optical multiplexer 710 and become a polarization-multiplexed optical signal. The polarization-multiplexed optical signal outputted from the optical multiplexer 710 is inputted to the polarization scrambler 140. The polarization scrambler 140 carries out polarization scramble of the inputted polarization-multiplexed optical signal in accordance with a control signal generated from the polarization scrambler driver 130, and the polarization-multiplexed optical signal subjected to polarization scramble is outputted from the polarization scrambler 140. The polarization-multiplexed optical signal outputted from the polarization scrambler 140 passes through the optical fiber transmission line 150 as the transmitted polarization-multiplexed optical signal of the wavelength multiplexing optical transmitter 40.

The control signal generated by the polarization scrambler driver 130 is a control signal having a predetermined frequency, and the frequency corresponds to a polarization scrambling frequency of the polarization scrambler 140. At this occasion, although the polarization scrambling frequency may of any value, it is pertinent to set the polarization scrambling frequency to a frequency higher than a frequency inherent to an FEC circuit achieving an effect of reducing PDL by polarization scramble and the optical nonlinearity effect. The polarization scrambler information acquiring part 120 acquires set information (for example, a polarization scrambling frequency, a direction of a variation over time of polarization scramble, and a pattern of the variation or the like) of the polarization scrambler 140 carrying out polarization scramble from the polarization scrambler 140, and transfers the set information through the control network 30.

The wavelength multiplexing optical receiver 50 of FIG. 13 includes the optical demultiplexer 720, and the plural optical receivers 20 (−1, −2, . . . , −n). The optical receivers 20 (−1, −2, . . . , −n) include the polarization dependent photoelectric detecting parts 510 (−1, −2, . . . , −n), and the digital signal processing parts 520 (−1, −2, . . . , −n) having the polarization scramble canceling signal processing parts 526 (−1, −2, . . . , −n) of canceling the polarization scrambling.

The optical receivers 20 (−1, −2, . . . , −n) differ in constitutions thereof by whether an optical modulating signal to be transmitted is constituted by a single polarized wave, or a polarization-multiplexed wave. In a case where the transmitted optical signal is constituted by the single polarized wave, a constitution as in FIG. 9 described above is constructed, and in a case where the transmitted optical signal is constituted by the polarization-multiplexed wave, a constitution as in FIG. 10 described above is constructed.

The polarization-multiplexed optical signal which has been transmitted from the wavelength multiplexing optical transmitter 40 and passed through the optical fiber transmission line 150 is inputted to the wavelength multiplexing optical receiver 50 of FIG. 13, and inputted to the optical demultiplexer 720. The polarization-multiplexed optical signal passing through the optical demultiplexer 720 is demultiplexed, and the demultiplexed polarization-multiplexed optical signals are respectively inputted to the optical receivers 20 (−1, −2, . . . , −n). The optical signals inputted to the optical receivers 20 (−1, −2, . . . , −n) are inputted to the polarization dependent photoelectric detecting parts 510 (−1, −2, . . . , −n), and converted into electric signals. The converted electric signals are inputted to the digital signal processing parts 520 (−1, −2, . . . , −n), and output data signals are outputted by carrying out series of operations of the digital signal processing parts 520 (−1, −2, . . . , −n) having the polarization scramble canceling signal processing parts 526 (−1, −2, . . . , −n) explained in reference to FIG. 9, and FIG. 10.

The set information of the polarization scrambler 140 of carrying out polarization scramble is transferred from the polarization scrambler information acquiring part 120 through the control network 30, and the set information is received by the polarization scramble canceling part processing part controlling part 160. The polarization scramble canceling signal processing part controlling part 530 transfers the set information of the polarization scrambler 140 to the polarization scramble canceling signal processing parts 526 (−1, −2, . . . , −n) at insides of the digital signal processing parts 520 (−1, −2, . . . , −n). The polarization scramble canceling signal processing parts 526 (−1, −2, . . . , −n) cancel the polarization scrambling based on the set information of the polarization scrambler 140.

The polarization scramble canceling signal processing part controlling part 530 may be made to be able to make access to the set information of the polarization scrambler 140 by preparing a database for storing the set information on the control network 30. Or, the set information of the polarization scrambler 140 may be inputted froth the polarization scrambler information acquiring part 120 to the optical fiber transmission line 150 by a monitoring control optical signal (OSC, Optical Supervisor Call), and the set information may be acquired by receiving the monitoring control optical signal from the optical fiber transmission line 150 by the polarization scramble canceling signal processing part controlling part 530 which includes an optical detecting part. Further, the polarization scramble canceling signal processing parts 526 (−1, −2, . . . , −n) may be operated by previously setting information of the polarization scrambler 140 to the polarization scramble canceling signal processing parts 526 (−1, −2, . . . , −n) at insides of the digital signal processing parts 520 (−1, −2, . . . , −n). Or, a polarization state monitoring part of monitoring the polarization state of an optical signal may be installed, and the set information of the polarization scrambler 140 may be read from a variation in the polarization state.

As explained above, according to the wavelength multiplexing optical transmission and reception system of the fifth embodiment, the number of the polarization scramblers 140 (−1, −2, . . . , −n) can therefore be reduced by summarizing the respective optical signals from the optical transmitting part 110 (−1, −2, . . . , −n) into wavelength-multiplexed optical signal multiplexed by the optical multiplexer 710, and receiving the optical signals by the optical receivers 20 (−1, −2, . . . , −n) which include the digital signal processing parts 520 (−1, −2, . . . , −n) which have the polarization scramble canceling signal processing parts 526 (−1, −2, . . . , −n).

6. Constitution Example

By the above-described respective embodiments, for example, an optical transmitter receiver, and an optical transmission and reception system can be constituted as follows.

For example, in an optical transceiver which includes an optical transmitter of transmitting an optical signal, and an optical receiver of receiving the optical signal, the optical transmitter includes optical transmission unit of generating the optical signal, and polarization scramble unit of bringing the optical signal into polarization scrambling, and the optical receiver includes polarization dependent optical receiving unit, and polarization scrambling cancel unit of canceling the polarization scrambling of the optical signal.

The polarization dependent optical receiving unit includes polarization dependent optical detection unit, and digital signal processing unit of recovering an electric signal converted by the polarization dependent optical detection unit to a data signal by a digital signal processing technology, and the polarization scrambling cancel unit cancels the polarization scrambling of the optical signal by a digital signal processing operation at inside of the digital signal processing unit with regard to the electric signal.

The polarization scrambling cancel unit is polarization descramble unit of carrying out polarization scramble by a pattern of a variation over time in a direction inverse to a direction of the polarization scramble of the polarization scramble unit by a polarization scrambling frequency the same as a polarization scrambling frequency set by the polarization scramble unit as one of features thereof.

In a wavelength multiplexing optical transceiver using the plural optical transmitter receivers described above, a wavelength multiplexing optical transmitter includes the plural optical transmission units of outputting the optical signals having different wavelengths, the plural optical transmitters which include plural polarization scramble units of bringing the optical signals of the different wavelengths to polarization scrambling by different polarization scramble frequencies, and optical multiplexing unit of outputting a wavelength-multiplexed optical signal by multiplexing the optical signals of the different wavelengths, and a polarization-multiplexed optical receiver includes optical demultiplexing unit of demultiplexing the polarization-multiplexed optical signal to the optical signals of the different wavelengths, and polarization scrambling cancel unit of canceling the polarization scrambling of the optical signals brought into the polarization scrambling by the different frequency scramble frequencies.

In a wavelength multiplexing optical transceiver using the plural optical transceivers described above, a wavelength multiplexing optical transmitter includes the plural optical transmission units of outputting the optical signals of the different wavelengths, the optical multiplexing unit of outputting a polarization-multiplexed optical signal by multiplexing the optical signals of the different wavelengths, and the polarization scramble unit of bringing the polarization-multiplexed optical signal into polarization scrambling, a wavelength multiplexing optical receiver includes polarization scrambling cancel unit of canceling the polarization scrambling of the polarization-multiplexed optical signal, optical demultiplexing unit of demultiplexing the polarization-multiplexed optical signal into the optical signals of the different wavelengths, and the plural polarization dependent optical receiving units, and the polarization scrambling cancel unit is polarization descramble unit of carrying out polarization scramble by a pattern of a variation over time in a direction inverse to a direction of the polarization scramble of the polarization scramble unit by a polarization scrambling frequency the same as the polarization scrambling frequency set by the polarization scramble unit with regard to the polarization-multiplexed optical signal brought into the polarization scrambling by the polarization scramble unit of the wavelength multiplexing optical transmitter as one of features thereof.

In a wavelength multiplexing optical transceiver using plural units of the optical transceiver described above, a wavelength multiplexing optical transmitter includes the plural optical transmission units of outputting the optical signals of different wavelengths, the optical multiplexing unit of outputting a polarization-multiplexed optical signal by multiplexing the optical signals of the different wavelengths, and the polarization scramble unit of bringing the polarization-multiplexed optical signal into polarization scrambling, a wavelength multiplexing optical receiver includes optical demultiplexing unit of demultiplexing the polarization-multiplexed optical signal into the optical signals of the different wavelengths, and the plural polarization dependent optical receiving units which include the polarization scrambling cancel unit, the polarization dependent optical receiving unit includes the polarization dependent optical detection unit, and the digital signal processing unit of recovering the electric signals converted by the polarization dependent optical detection unit into data signals by a digital signal processing technology, and the polarization scrambling cancel unit is polarization scramble canceling signal processing unit of canceling the polarization scrambling of the optical signals by a digital signal processing operation at inside of the digital signal processing unit as one of features thereof.

In the above-described transmitter receiver, the optical receivers receive the optical signals brought into the polarization scrambling.

An optical receiver includes a unit of adjusting a timing of canceling polarization scrambling in a case where a variation of a polarization scrambling frequency or a shift of a timing thereof of the optical transmitter is brought about, or in a case where set information of the polarization scramble unit of the optical transmitter is not acquired.

The optical receiver includes a polarization state controlling unit after the polarization scrambling cancel unit, detects an amount of a variation in a polarization state of the optical signal and calculates an average over time thereof after the polarization state controlling unit, and controls the polarization state of the optical signal by utilizing an amount of the average over time.

In the above-described optical transceiver, an optical fiber transmission line is connected between the optical transceivers.

Polarization scramble information controlling unit of acquiring the set information of the polarization scramble unit and controlling the polarization scrambling cancel unit is provided, and the polarization scramble information controlling unit is a unit of observing and acquiring a polarization state of a control network or a database or an optical monitoring control signal or the optical signal.

The present invention can be utilized in, for example, an optical transmission system.

What is claimed is:

1. An optical transmission and reception system comprising:
   an optical transmitter that transmits an optical signal; and
   an optical receiver that receives the optical signal through an optical fiber,
   wherein the optical transmitter includes:
   an optical transmission part that generates the optical signal; and
   a polarization scrambling part that brings the optical signal into polarization scrambling state; and
   wherein the optical receiver includes:
   a polarization dependent photoelectric detection part that converts the optical signal received through the optical fiber into an electric signal; and
   a digital signal processing part having a polarization scramble canceling part that cancels the polarization scrambling state using a digital signal processing operation by calculating an inverse matrix of a matrix of Jones Matrix representing the polarization scrambling state at the polarization scrambling part based on a polarization scrambling frequency at the polarization scrambling part and a pattern of a variation over time of the polarization scrambling state of the polarization scrambling part, and multiplying the electric signal converted by the polarization dependent photoelectric detecting part by the inverse matrix.

2. The optical transmission and reception system according to claim 1, further comprising:
   a part acquiring information concerned with polarization scrambling part, that transmits configuration information including the polarization scrambling frequency of the polarization scrambling part and the direction and the pattern of the variation of the polarization scrambling state; and
   a polarization scramble canceling control part that controls the polarization scramble canceling part in accordance with the polarization scrambling frequency and the direction and the pattern of the variation of the polarization scrambling in the configuration information by inputting the configuration information from a part acquiring information concerned with polarization scrambling part.

3. The optical transmission and reception system according to claim 2, wherein the configuration information is transmitted from a part acquiring information concerned with polarization scrambling part to the polarization scramble canceling control part via a control network, or via a database of the control network.

4. The optical transmission and reception system according to claim 2, wherein a part acquiring information concerned with polarization scrambling part, outputs a monitoring control optical signal which includes the set information into the monitoring control optical signal to the fiber; and
   wherein the polarization scramble canceling control part receives the monitoring control optical signal from the optical fiber by an optical detection part.

5. The optical transmission and reception system according to claim 1, wherein the polarization scrambling cancel part is driven in accordance with previously determined set information including the polarization scrambling frequency of the polarization scrambling part and the direction and the pattern of the variation of the polarization scrambling state.

6. The optical transmission and reception system according to claim 1, wherein the optical receiver further includes:
   a part monitoring polarization state, that monitors a polarization state of the received optical signal and reads the polarization scrambling frequency of the polarization scrambling part and the direction and the pattern of the variation of the polarization scrambling state from a variation in the polarization state.

7. The optical transmission and reception system according to claim 1, wherein the optical receiver measures a bit error rate or a degradation in an eye opening of an eye pattern by the polarization dependent optical reception part, delivers the bit error rate or the degradation in the eye opening of the eye pattern to the polarization scrambling cancel part, and adjusts a polarization scrambling frequency of the polarization scrambling cancel part such these values become small.

8. The optical transmission and reception system according to claim 1, further comprising:
   a polarization state control part after the polarization scrambling cancel part,
   wherein an amount of a variation in a polarization state of the optical signal is detected and an average thereof over time is calculated, and the polarization state of the optical signal is controlled by utilizing the average over time.

9. The optical transmission and reception system according to claim 1,
   wherein the optical transmitter includes:
   a plurality of the optical transmission parts;
   a plurality of the polarization scrambling parts; and
   a multiplexer that generates a wavelength-multiplexed optical signal by multiplexing the optical signals outputted from the polarization scrambling parts and outputs the polarization-multiplexed optical signal to the optical fiber, and
   wherein the optical receiver includes:
   a plurality of the polarization dependent photoelectric detection parts;
   a plurality of the digital signal processing parts; and
   a demultiplexer that demultiplexes the polarization-multiplexed optical signal received through the optical fiber and outputs the demultiplexed polarization-multiplexed optical signals to the polarization dependent photoelectric detection parts.

10. The optical transmission and reception system according to claim 1,
    wherein the optical transmitter includes:
    a plurality of the optical transmission parts; and
    a multiplexer that generates a wavelength-multiplexed optical signal by multiplexing the optical signals outputted from the optical transmission parts;
    wherein the polarization scrambling part brings the wavelength-multiplexed optical signal generated by the multiplexer into polarization scrambling state and outputs the polarization-multiplexed optical signal to the optical fiber;
    wherein the optical receiver includes:
    a plurality of the polarization dependent photoelectric detection parts;
    a plurality of the digital signal processing parts; and a demultiplexer that demultiplexes the wavelength-multiplexed optical signal received through the optical fiber and outputs the demultiplexed wavelength-multiplexed optical signals to the plurality of polarization dependent photoelectric detection parts.

11. An optical receiver in an optical transmission and reception system including an optical transmitter that brings an optical signal into polarization scrambling state by a polarization scrambling part and transmits the optical signal, and an optical receiver that receives the optical signal through an optical fiber, the optical receiver comprising:

a polarization dependent photoelectric detection part of converting the optical signal received through the optical fiber into an electric signal; and a digital signal processing part including a polarization scrambling cancel part that cancels the polarization scrambling state by a digital signal processing operation by calculating an inverse matrix of a matrix of Jones Matrix representing the polarization scrambling state of the polarization scrambling part based on a polarization scrambling frequency of the polarization scrambling part, and a pattern of a variation over time of polarization scrambling state of the polarization scrambling part, and multiplexing the electric signal converted by the polarization dependent photoelectric detection part by the inverse matrix.

\* \* \* \* \*